US012176160B2

(12) United States Patent

Grife et al.

(10) Patent No.: US 12,176,160 B2

(45) Date of Patent: *Dec. 24, 2024

(54) EXTERNAL SWITCH COUPLER FOR PAD-MOUNTED TRANSFORMERS

(71) Applicant: Leeward Asset Management, LLC, Dallas, TX (US)

(72) Inventors: Ronald D. Grife, Flower Mound, TX (US); Patrick Rafferty, Glenn Heights, TX (US)

(73) Assignee: Leeward Asset Management, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,806

(22) Filed: Mar. 24, 2023

(65) Prior Publication Data

US 2023/0238198 A1 Jul. 27, 2023

Related U.S. Application Data

(63) Continuation of application No. 16/742,517, filed on Jan. 14, 2020, now Pat. No. 11,646,168.

(51) Int. Cl.

| | |
|---|---|
| ***H01H 19/14*** | (2006.01) |
| ***H01F 27/02*** | (2006.01) |

(Continued)

(52) U.S. Cl.

CPC ............. *H01H 19/14* (2013.01); *H01F 27/02* (2013.01); *H01F 27/06* (2013.01); *H01F 27/402* (2013.01);

(Continued)

(58) Field of Classification Search

CPC ......... H01H 2300/056; H01H 2300/06; H01H 2300/064; H01H 2300/066; H01H 19/00;

(Continued)

(56) References Cited

U.S. PATENT DOCUMENTS

| | | |
|---|---|---|
| 3,259,808 A | 7/1966 | Gramlich |
| 7,142,410 B2 | 11/2006 | Norris et al. |

(Continued)

FOREIGN PATENT DOCUMENTS

| | | | |
|---|---|---|---|
| CN | 107910207 A * | 4/2018 | ............... H01H 3/02 |
| CN | 108461316 A * | 8/2018 | ............... H01H 3/02 |
| WO | 2010093079 A1 | 8/2010 | |

OTHER PUBLICATIONS

International Search Report and Written Opinion of the U.S. Patent and Trademark Office dated May 24, 2021 for PCT/US2020/67348, 23 pp.

*Primary Examiner* — Anthony R Jimenez

(74) *Attorney, Agent, or Firm* — Daniel J. Chalker; Edwin S. Flores; Chalker Flores, LLP

(57) ABSTRACT

An external switch actuator includes: a guide tube having a first end and a second end, the first end configured to be attached to a door of a compartment in substantial alignment with both a hole in the door and a switch actuator within the compartment, and the second end configured to be disposed within an interior of the compartment and separated from the switch actuator by a gap when the door is closed; a coupling shaft configured to be operably placed within the guide tube, the coupling shaft having an electrical insulator disposed between an actuator side adapter and a switch side adapter, and a length equal to or greater than a distance between the switch actuator and the hole in the door when the door is closed.

29 Claims, 24 Drawing Sheets

(51) Int. Cl.
*H01F 27/06* (2006.01)
*H01F 27/40* (2006.01)
*H01H 9/28* (2006.01)

(52) U.S. Cl.
CPC ....... *H01H 9/287* (2013.01); *H01H 2221/078* (2013.01)

(58) Field of Classification Search
CPC .... H01H 19/10; H01H 19/14; H01H 2221/00; H01H 2221/024; H01H 2221/028; H01H 2223/00; H01H 2223/01; H01H 2223/014; H01H 2231/00; H01H 2231/016; H01H 19/04; H01H 19/20; H01H 19/28; H01H 19/36; H01H 27/00; H01H 71/02; H01H 71/08; H01H 73/00; H01H 73/06; H01H 2003/00; H01H 2003/02; H01H 2003/028; H01H 2003/32; H01H 2003/46; H01H 2009/02; H01H 2009/0285; H01H 2009/0292; H01H 2033/66246; H01H 2217/00; H01H 9/00; H01H 9/28; H01H 9/281; H01H 9/286; H01H 9/287; H01H 2221/078; H01H 2221/08; H01H 3/00; H01H 3/02; H01H 9/0005; H01H 9/0016; H01H 9/0044; H01H 9/02; H01H 9/0264; H01H 9/06; H01H 9/22; H01F 27/02; H01F 27/06; H01F 27/402
See application file for complete search history.

(56) References Cited

U.S. PATENT DOCUMENTS

| | | | | |
|---|---|---|---|---|
| 8,043,129 | B2 | 10/2011 | Schoten et al. | |
| 11,646,168 | B2 * | 5/2023 | Grife | H01F 27/06 174/53 |
| 2012/0297901 | A1 | 11/2012 | Blundell | |
| 2015/0318127 | A1 | 11/2015 | Maine | |
| 2015/0364277 | A1 | 12/2015 | Fischer et al. | |
| 2016/0126026 | A1 | 5/2016 | Vette | |
| 2017/0372856 | A1 | 12/2017 | Singh et al. | |

* cited by examiner

EXTERNAL SWITCH COUPLER FOR PAD-MOUNTED TRANSFORMERS

CROSS-REFERENCE TO RELATED APPLICATIONS

This application is a continuation of U.S. application Ser. No. 16/742,517 filed on Jan. 14, 2020. The contents of which is incorporated by reference in its entirety.

STATEMENT OF FEDERALLY FUNDED RESEARCH

Not applicable.

TECHNICAL FIELD OF THE INVENTION

The present invention relates in general to the field of pad-mounted transformers. In particular, the present invention relates to a external actuator for operating a switch within a pad-mounted transformer.

BACKGROUND OF THE INVENTION

Without limiting the scope of the invention, its background is described in connection with pad-mounted electrical transformers.

Pad-mounted transformers are known to be a safety risk during switching operations due to various factors that may be exacerbated by the condition of the device as well as the available electrical current if a fault should occur.

As illustrated in FIGS. 1A and 1B, pad-mounted transformers 100 typically include a tank 102 containing an electrical transformer 104 and a load break switch 106 electrically connected to the electrical transformer 104. A compartment 108 is attached to the front wall 110 of the tank 102 and includes a primary compartment 112 adjacent to a secondary compartment 114. The primary compartment 122 is also referred to as the primary side, high voltage compartment, or high voltage side, etc. The secondary compartment 114 is also referred to as the secondary side, low voltage compartment, or low voltage side. The primary compartment 112 has a primary door 116. The secondary compartment 114 has a secondary door 118. A set of primary voltage bushings 120 are mounted on the front wall 110 of the tank 102 within the primary compartment 112 and are electrically connected to the load break switch 106. The primary voltage bushings 120 are shown for a three phase radial design. Three additional primary voltage bushings are required for a three phase loop design. A switch actuator 122 is mounted on the front wall 110 of the tank 102 within the primary compartment 112 and is operably connected to the load break switch 106. The switch actuator 122 is used to open the load break switch 106 to electrically disconnect the primary voltage bushings 120 from the transformer 104 and to close the load break switch 106 to electrically connect the primary voltage bushings 120 to the transformer 104. A set of secondary voltage bushings 124 and a ground bushing 126 are mounted on the front wall 110 of the tank 102 within the secondary compartment 114 and are electrically connected to the electrical transformer 104. Note that the location, orientation, shape and size of the transformer 104, load break switch 106, primary voltage bushings 120, switch actuator 122, secondary voltage bushings 124 and ground bushing 126 are for illustrative purposes only and will vary depending on the design specifications of the pad-mounted transformer 100. Moreover, FIGS. 1A and 1B are not to scale and many features typically or optionally found in pad-mounted transformers are not shown because they are common and not essential for an understanding of the various embodiments of the invention described herein.

To switch a common pad-mounted transformer (e.g., 100) installed at a wind farm, the worker must first don electrical personal protective equipment, which in some cases may include a 40 Cal arc flash suit, which is heavy and very hot. The worker then opens the secondary door 118 first where medium voltage is present and where the higher electrical arc flash risk is present. Next, the worker opens the primary door 116 where the load break switch 106 is typically located. At this time the worker is exposed to the high electrical arc flash potential on the secondary side 114 (typically 600v-700v) as well as the high voltage potential on the primary side 112 (typically 34.5 kV). Next, the worker fixes a hot-stick to the switch actuator 122 and rotates it 90 degrees to operate the load break switch 106. Additional risks include the possibility of igniting flammable gasses in the transformer tank during the switching process. The risks at other installations can be similar.

As a result, it is desirable to externally operate the load break switch with the primary door closed.

SUMMARY OF THE INVENTION

In some embodiments of the disclosure, an external switch actuator includes: a guide tube having a first end and a second end; the first end of the guide tube configured to be attached to a door of a compartment in substantial alignment with both a hole in the door and a switch actuator within the compartment; the second end of the guide tube configured to be disposed within an interior of the compartment and separated from the switch actuator by a gap when the door is closed; a coupling shaft configured to be operably placed within the guide tube, the coupling shaft having an electrical insulator disposed between an actuator side adapter and a switch side adapter; the coupling shaft having a length equal to or greater than a distance between the switch actuator and the hole in the door such that the switch side adapter operably engages the switch actuator and the actuator side adapter is operably accessible from an exterior of the door when the door is closed; and a cover or enclosure attached to the first end of the guide tube or configured to be attached to the exterior of the door proximate to the hole, wherein the cover or enclosure has an open position and a closed position.

In another aspect, the guide tube has a length that allows the door to be opened when the guide tube is attached to the door. In another aspect, a lockable fastener is configured to secure the cover or enclosure in the closed position. In another aspect, the cover or enclosure is removably attached to the first end of the guide tube or the exterior of the door. In another aspect, a motorized actuator is operably configured to engage the actuator side adapter, and a controller communicably coupled to the motorized actuator. In another aspect, the first end of the guide tube having flange or plate. In another aspect, the cover or enclosure is removably attached to the flange or plate. In another aspect, the cover or enclosure includes a box having an angled or beveled side attached to the flange or plate with a hinge, and the angled or beveled side positions the box at an angle of about 70-90 degrees with respect to the door when the box is in the open position. In another aspect, the cover or enclosure includes a box having a door. In another aspect, a moveable flap is operably connected to the second end of the guide tube.

In some embodiments of the disclosure, a method for installing an external switch actuator on a pad-mounted transformer includes: cutting a hole in a door of the pad-mounted transformer, wherein the hole is substantially aligned with a switch actuator within a compartment of the pad-mounted transformer; attaching a first end of a guide tube to the door, wherein a second end of the guide tube is disposed within an interior of the compartment and separated from the switch actuator by a gap when the door is closed; and attaching a cover or enclosure to the first end of the guide tube or the exterior of the door proximate to the hole, wherein the cover or enclosure has an open position and a closed position.

In another aspect, the method further includes: positioning a coupling shaft within the guide tube, the coupling shaft having an electrical insulator disposed between an actuator side adapter and a switch side adapter; and the coupling shaft having a length equal to or greater than a distance between the switch actuator and the hole in the door such that the switch side adapter operably engages the switch actuator and the actuator side adapter is operably accessible from an exterior of the door when the door is closed. In another aspect, the guide tube has a length that allows the door to be opened when the guide tube is attached to the door. In another aspect, the cover or enclosure includes a lockable fastener configured to secure the cover or enclosure in the closed position. In another aspect, the cover or enclosure is removeably attached to the first end of the guide tube or the exterior of the door. In another aspect, the first end of the guide tube includes a flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure includes a box having a door. In another aspect, the guide tube includes a moveable flap operably connected to the second end of the guide tube.

In some embodiments of the disclosure, an external switch actuator includes: a guide tube having a first end and a second end; a flange or plate attached to the first end of the guide tube, wherein the flange or plate is configured to be attached to a door of a compartment is substantial alignment with both a hole in the door and a switch actuator within the compartment; the second end of the guide tube configured to be disposed within an interior of the compartment and separated from the switch actuator by a gap when the door is closed; and a cover or enclosure attached to the flange or configured to be attached to an exterior of the door proximate to the hole, wherein the cover or enclosure has an open position and a closed position.

In another aspect, a coupling shaft is configured to be operably placed within the guide tube, the coupling shaft comprising a electrical insulator disposed between an actuator side adapter and a switch side adapter; and the coupling shaft having a length equal to or greater than a distance between the switch actuator and the hole in the door such that the switch side adapter operably engages the switch actuator and the actuator side adapter is operably accessible from an exterior of the door when the door is closed. In another aspect, the guide tube has a length that allows the door to be opened when the guide tube is attached to the door. In another aspect, a lockable fastener is configured to secure the cover or enclosure in the closed position. In another aspect, the cover or enclosure is removeably attached to the first end of the guide tube or the exterior of the door. In another aspect, a motorized actuator is operably configured to engage the actuator side adapter; and a controller is communicably coupled to the motorized actuator. In another aspect, the flange or plate is attached to the exterior of the door. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure includes a box having a door. In another aspect, a moveable flap is operably connected to the second end of the guide tube In some embodiments of the disclosure, a method operating a load break switch within a primary compartment of a pad-mounted transformer includes: providing a guide tube having a first end and a second end, wherein: (1) the first end of the guide tube is attached to a door of the primary compartment in substantial alignment with both a hole in the door and a switch actuator within the primary compartment, (2) the switch actuator is operably connected to the load break switch, (3) the second end of the guide tube is within an interior of the primary compartment and separated from the switch actuator by a gap when the door is closed; providing or positioning a coupling shaft within the guide tube, wherein: (1) the coupling shaft comprises an electrical insulator disposed between an actuator side adapter and a switch side adapter, (2) the coupling shaft has a length equal to or greater than a distance between the switch actuator and the hole in the door such that the switch side adapter operably engages the switch actuator and the actuator side adapter is operably accessible from an exterior of the door when the door is closed; attaching a motorized actuator, a hot stick or a handle to the actuator side adapter, wherein the motorized actuator is communicably coupled to a controller; and opening or closing the load break switch using the controller, the hot stick or the handle to rotate the coupling shaft.

In another aspect, the method further includes opening a cover or enclosure attached to the first end of the guide tube or the exterior of the door proximate to the hole. In another aspect, the guide tube has a length that allows the door to be opened when the guide tube is attached to the door. In another aspect, the cover or enclosure further includes a lockable fastener configured to secure the cover or enclosure in the closed position. In another aspect, the cover or enclosure is removeably attached to the first end of the guide tube or the exterior of the door. In another aspect, the first end of the guide tube comprises flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure comprises a box having a door. In another aspect, the guide tube further comprises a moveable flap operably connected to the second end of the guide tube.

In some embodiments of the disclosure, a pad-mounted transformer includes: a tank containing an electrical transformer and a switch electrically connected to the electrical transformer; a compartment attached to the tank, the tank including a primary compartment adjacent to a secondary compartment, wherein the primary compartment has a primary door and the secondary compartment has a secondary door; a set of primary voltage bushings within the primary compartment and electrically connected to the switch; a switch actuator within the primary compartment and operably connected to the switch; a set of secondary voltage bushings within the secondary compartment and electrically connected to the electrical transformer; a guide tube having a first end and a second end; the first end of the guide tube attached to the primary door in substantial alignment with both a hole in the primary door and the switch actuator; and the second end of the guide tube disposed within an interior of the primary compartment and separated from the switch actuator by a gap when the primary door is closed.

In another aspect, the pad-mounted transformer includes: a coupling shaft operably placed within the guide tube, the coupling shaft including an electrical insulator disposed between an actuator side adapter and a switch side adapter; and the coupling shaft having a length equal to or greater than a distance between the switch actuator and the hole in the primary door such that the switch side adapter operably engages the switch actuator and the actuator side adapter is operably accessible from an exterior of the primary door when the primary door is closed. In another aspect, a cover or enclosure is attached to the first end of the guide tube or configured to be attached to the exterior of the primary door proximate to the hole, wherein the cover or enclosure has an open position and a closed position. In another aspect, the guide tube has a length that allows the primary door to be opened when the guide tube is attached to the door. In another aspect, a lockable fastener is configured to secure the cover or enclosure in the closed position. In another aspect, the cover or enclosure is removeably attached to the first end of the guide tube or the exterior of the primary door. In another aspect, a motorized actuator is operably configured to engage the actuator side adapter; and a controller communicably coupled to the motorized actuator. In another aspect, the first end of the guide tube comprises flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure includes a box having a door. In another aspect, a moveable flap is operably connected to the second end of the guide tube.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1A:
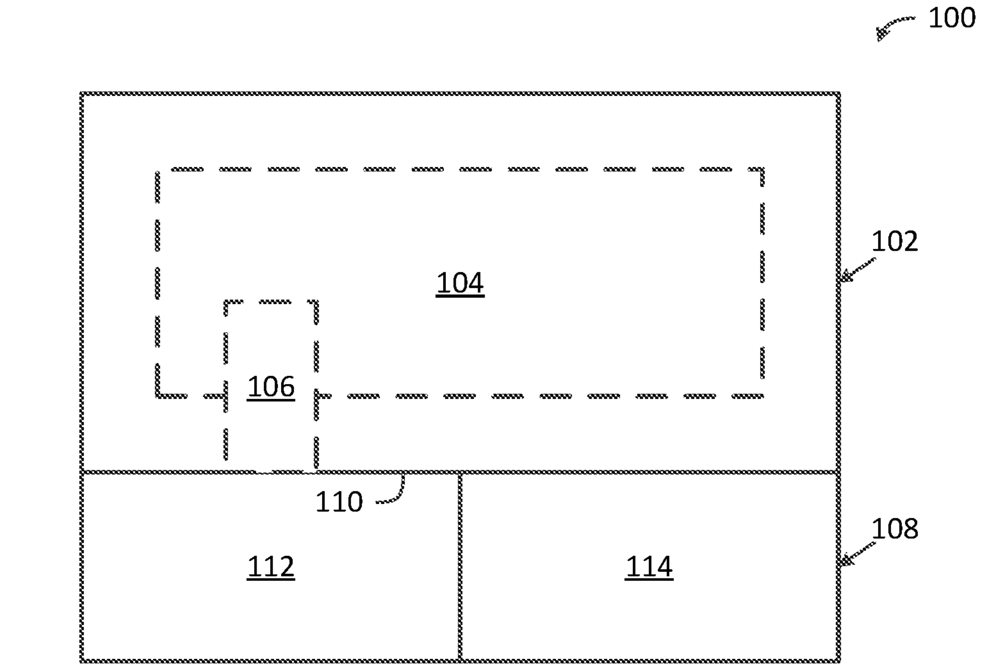
FIG. 1A (Prior Art)
FIG. 1A is a top view of a pad-mounted transformer according to the prior art.
Figure 1B:
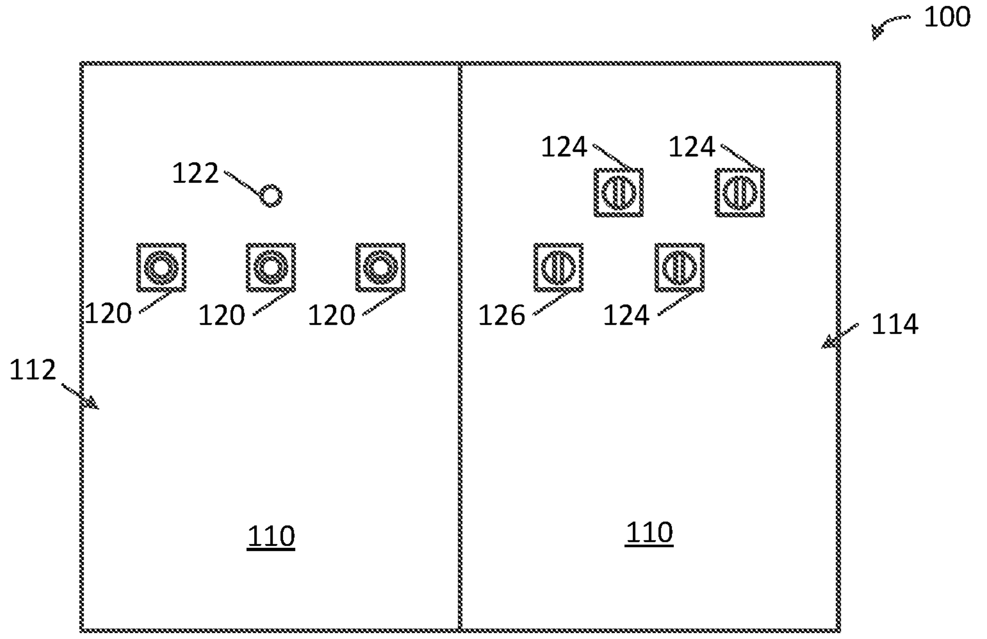
FIG. 1B (Prior Art)
FIG. 1B is view of a front tank wall inside the primary and secondary compartments of a pad-mounted transformer according to the prior art.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The various embodiments of the present invention provide an external switch actuator for pad-mounted transformers that mitigates the exposure of personnel to the electrical hazards inherent when opening the doors of pad-mounted transformers and operating the load break switch where medium and/or high voltage connections are present. The safety risks that a worker is exposed to can be mitigated in a number of ways: (1) It allows the worker to switch the pad-mounted transformer without opening the secondary door where the higher electrical arc flash risk is present; (2) It allows the worker to switch the pad-mounted transformer with minimal exposure to the primary side voltage; and/or (3) When coupled with a externally controlled motorized actuator, the worker may further mitigate the risk of switching by moving a significant distance away from the pad-mounted transformer while switching occurs. Note that the present invention is applicable to any pad-mounted transformer having a load break switch, and is not limited to wind-farm applications.

Generally speaking, various embodiments of the present invention include a hole cut in the primary door of the pad-mount transformer directly in line with the switch actuator of the load break switch, a tube installed in the hole and firmly attached to the primary door, and a coupling shaft that is made of an insulating material and designed to engage with the switch actuator. A motorized actuator can be attached to the coupling shaft to enable remote operation of the switch.

Figure 2:
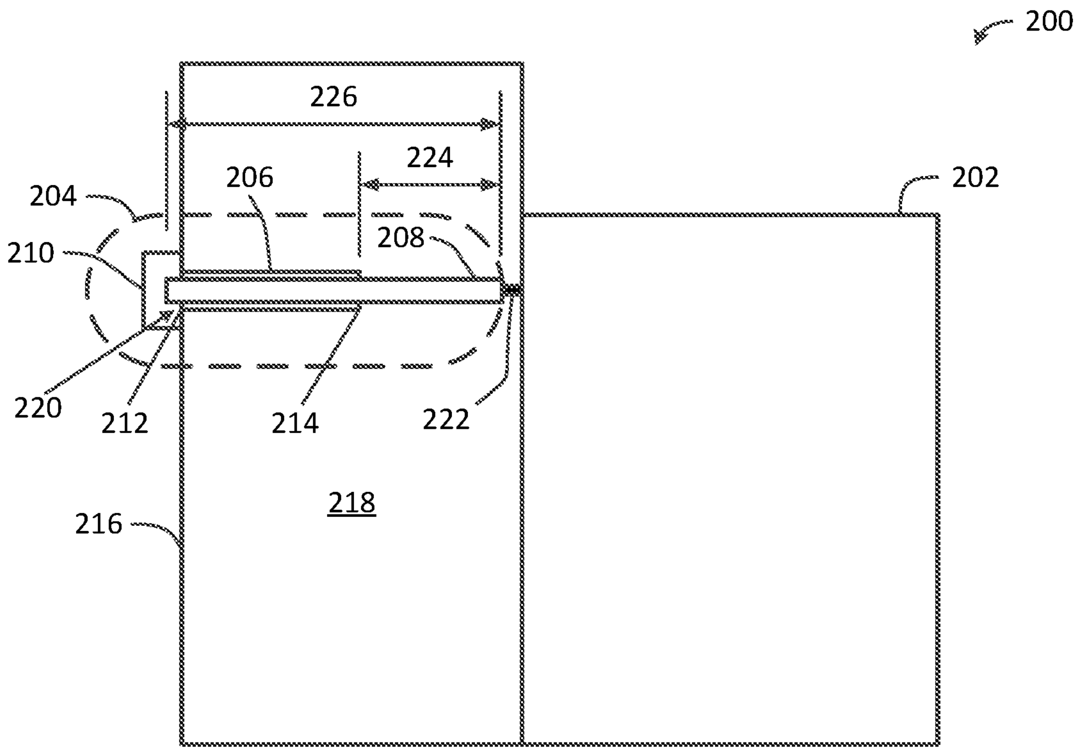
FIG. 2 is a block diagram illustrating a side view of a pad-mounted transformer with an external switch actuator in accordance with one embodiment of the present invention.

Now referring to FIG. 2, a block diagram 200 illustrating a side view of a pad-mounted transformer 202 with an external switch actuator 204 in accordance with one embodiment of the present invention is shown. The external switch actuator 204 includes a guide tube 206, a coupling shaft 208 and a cover or enclosure 210. The coupling shaft 208 is configured to be operably placed within the guide tube 206. The guide tube 206 has a first end 212 and a second end 214. The first end 212 of the guide tube 206 is configured to be attached to a door 216 of a compartment 218 in substantial alignment with both a hole 220 in the door 216 and a switch actuator 222 within the compartment 218. The second end 214 of the guide tube 206 is configured to be disposed within an interior of the compartment 218 and separated from the switch actuator 222 by a gap 224 when the door 216 is closed. The guide tube 206 should be long enough to provide proper alignment and support of the coupling shaft 208 while allowing the door 216 to be fully opened when the guide tube 206 is attached to the door 216. Moreover, the gap 224 should be sufficient to prevent electrical arcing from any of the live components with the compartment 218 to the guide tube 206. In some embodiments, the guide tube 206 may include a moveable flap attached to the second end 214 that prevents foreign materials or animals/insects from getting inside the guide tube 206 when the coupling shaft 208 is not present, but allows the coupling shaft 208 to move freely past the flap in either direction. The guide tube 206 can be made of metal, an electrical insulator or other suitable material. In some embodiments, the guide tube 206 can be about ten inches long and have an outer diameter of about 2.5 to 3.0 inches. Other dimensions can be used as will be appreciated by one skilled in the art. The guide tube 206 can be attached to the interior or the exterior of the door 216.

Figure 3A:
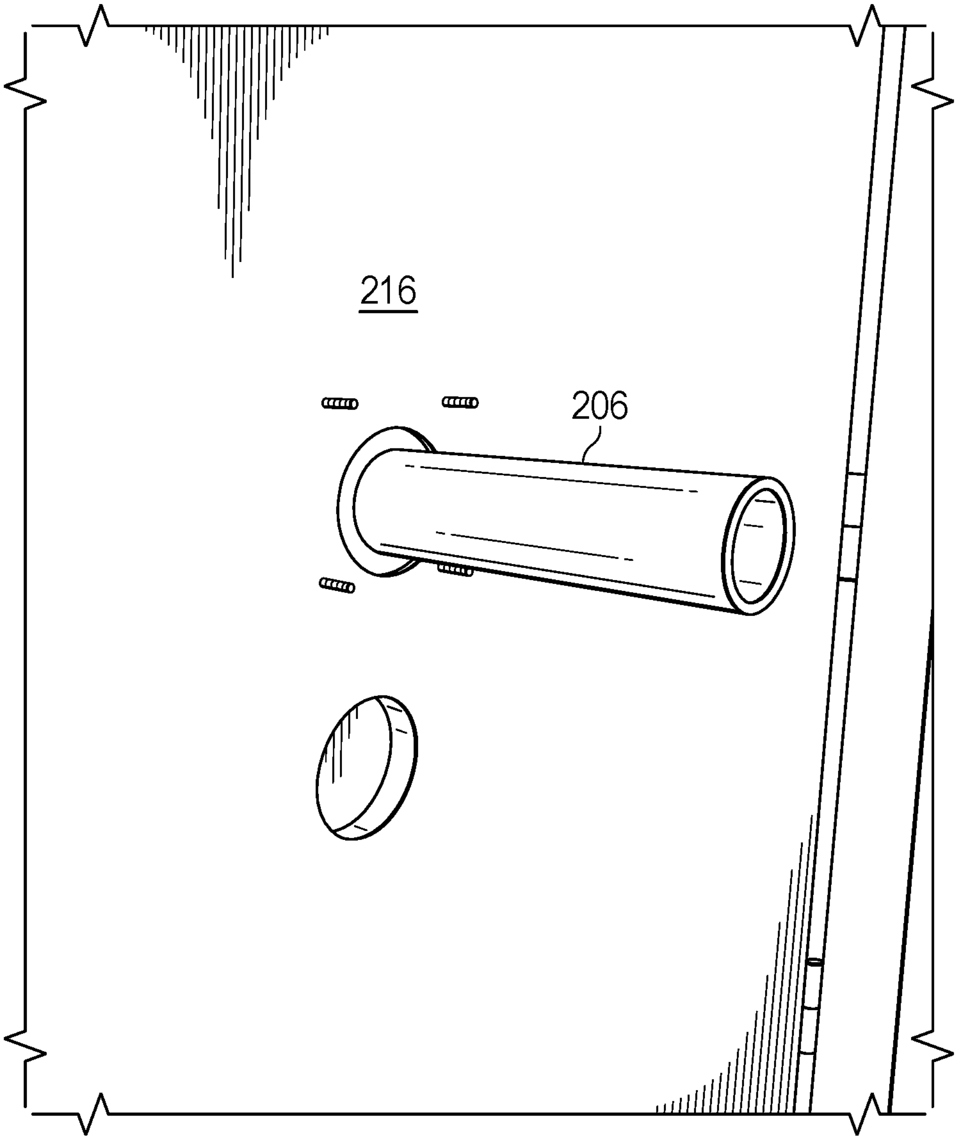
FIGS. 3A-3C are images illustrating the guide tube installed in the door of a pad-mounted transformer in accordance with one embodiment of the present invention.
Figure 3B:
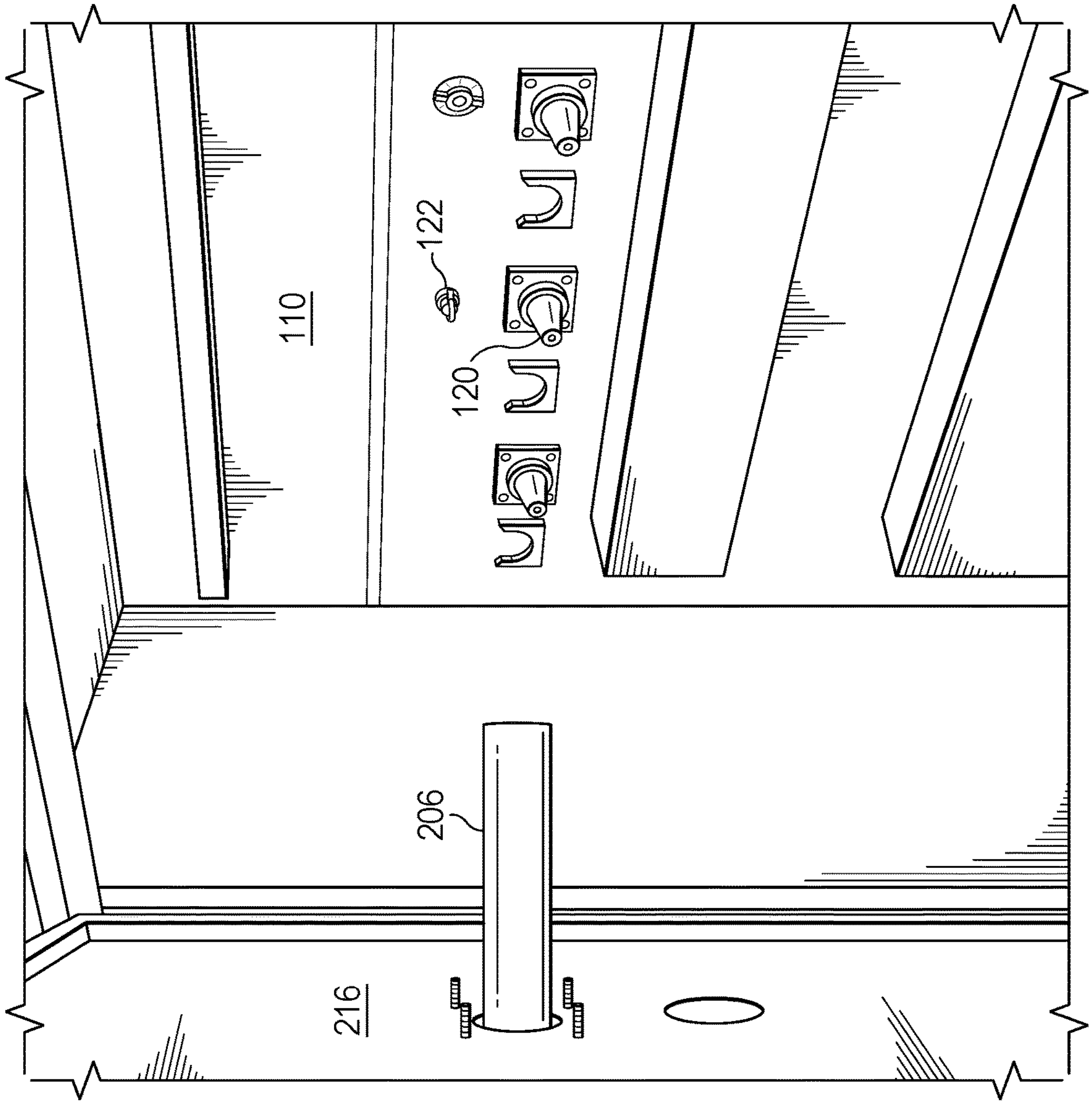
Figure 3C:
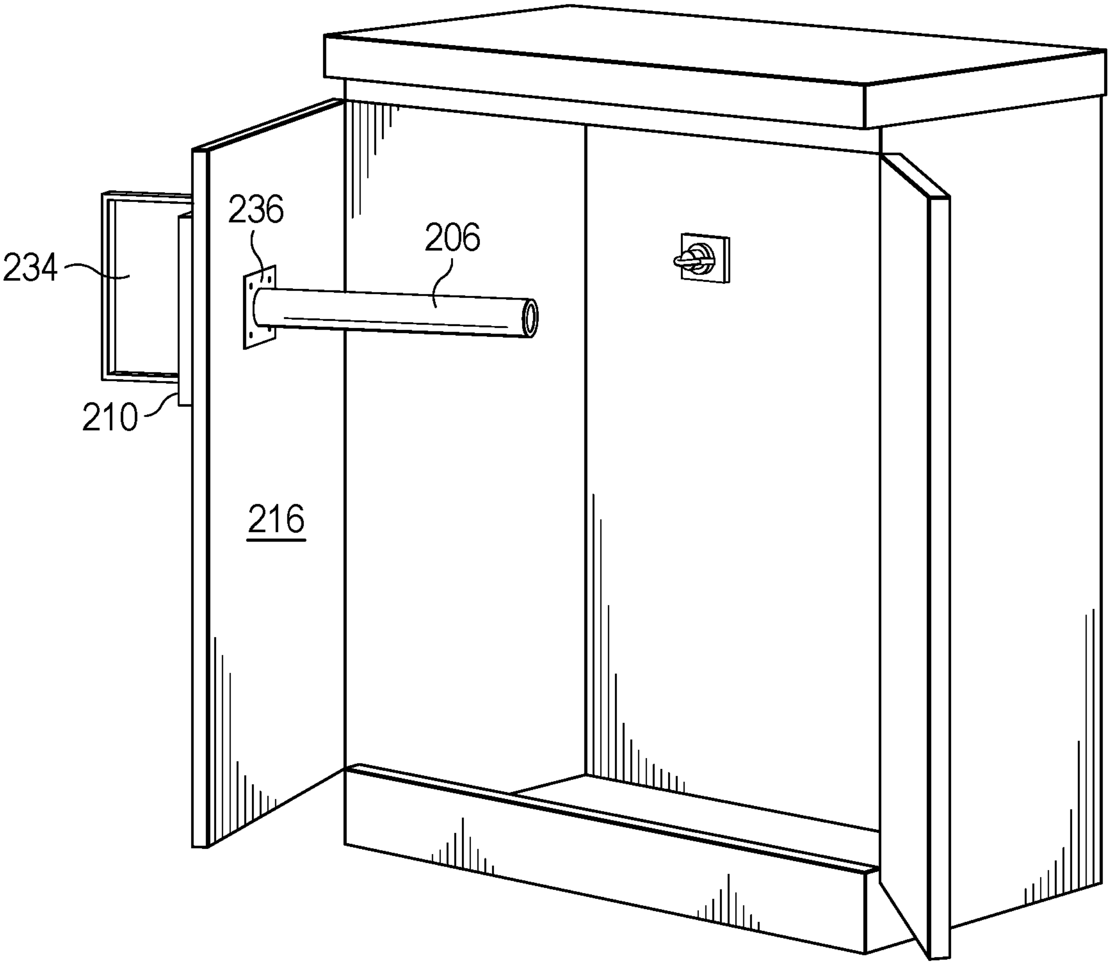

Attaching the guide tube 206 to the exterior of the door 216 such that the guide tube 206 extends through the hole 200 provides additional structural support. FIGS. 3A-3C are images illustrating the guide tube 206 installed in the door 216 of a pad-mounted transformer 202 in accordance with one embodiment of the present invention.

Figure 4:
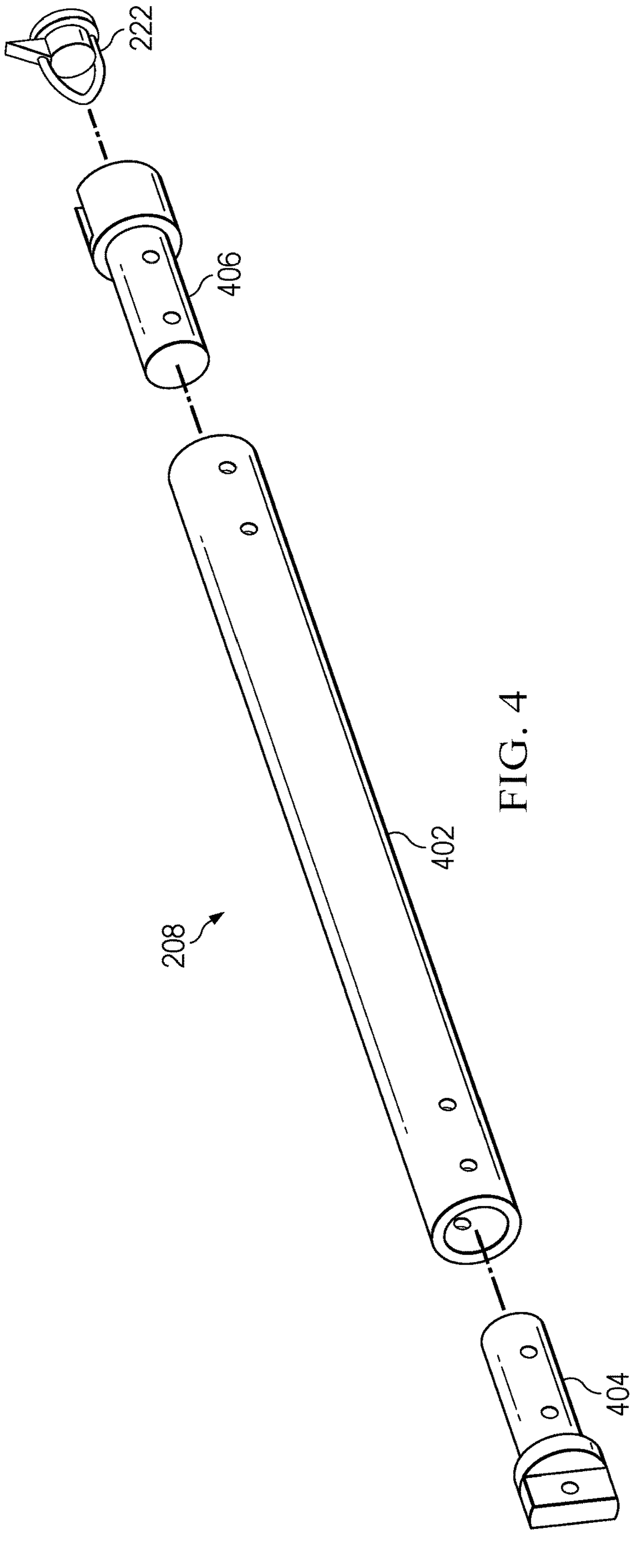
FIG. 4 is an image of an exploded view of a coupling shaft in accordance with one embodiment of the present invention.
Figure 5A:
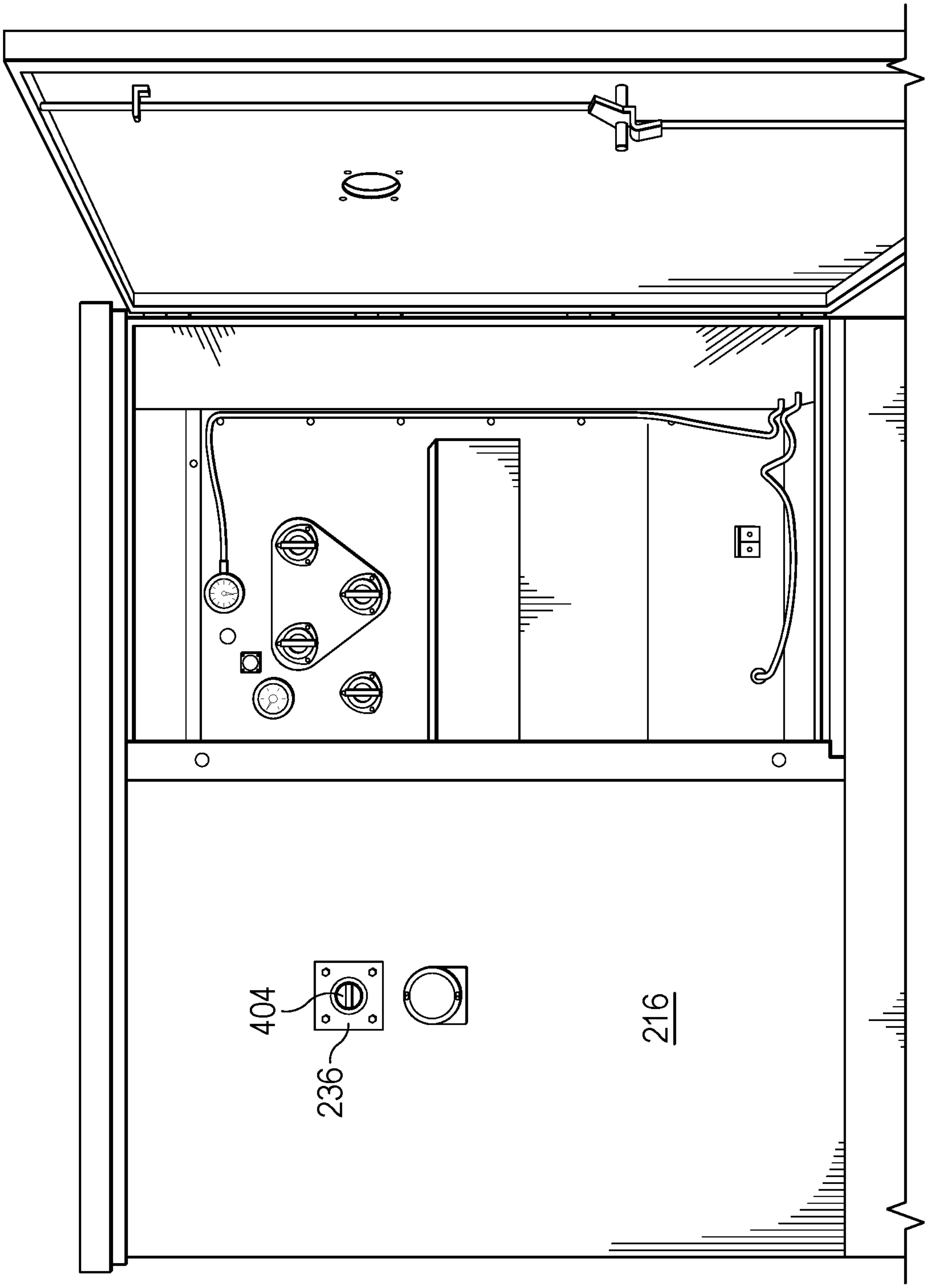
FIGS. 5A-5E are images illustrating the coupling shaft positioned within the guide tube in accordance with one embodiment of the present invention.
Figure 5B:
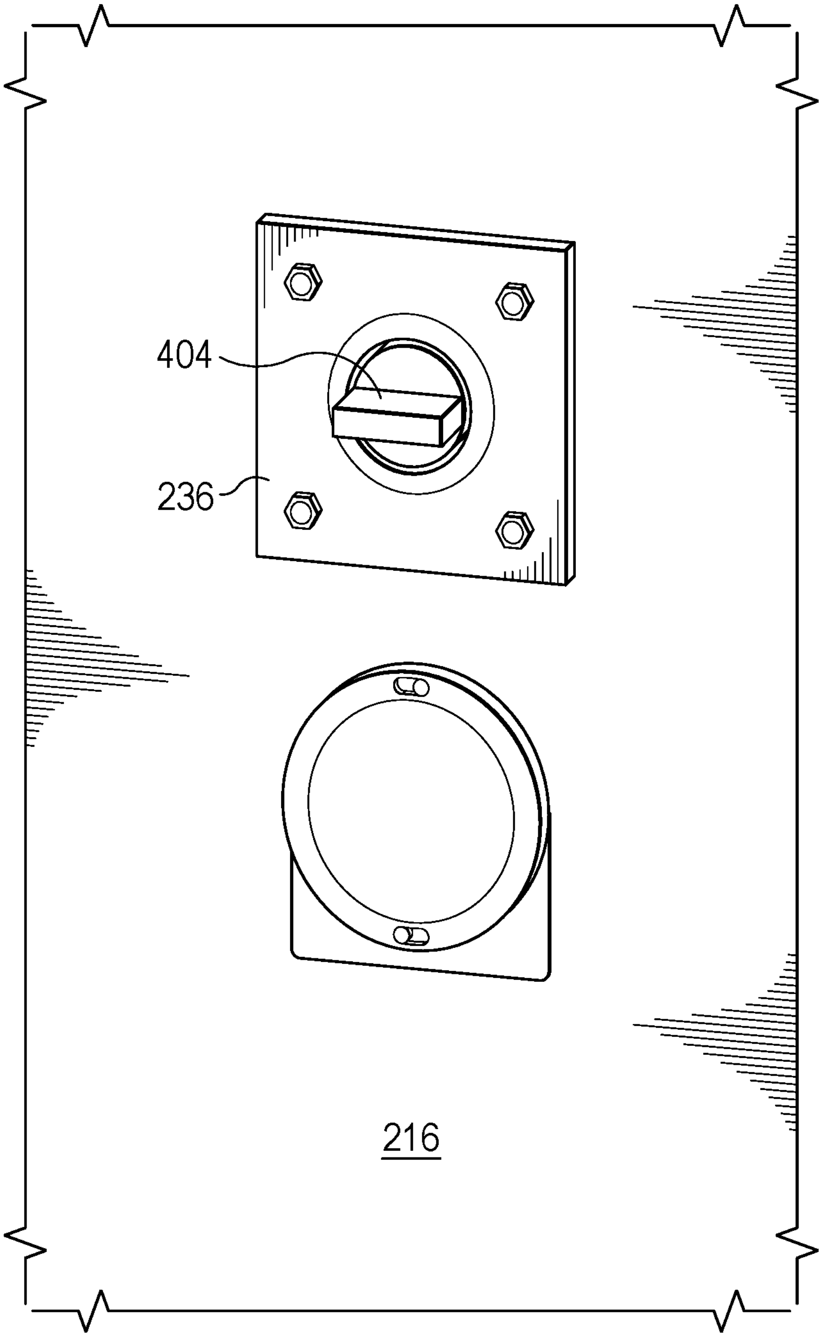
Figure 5C:
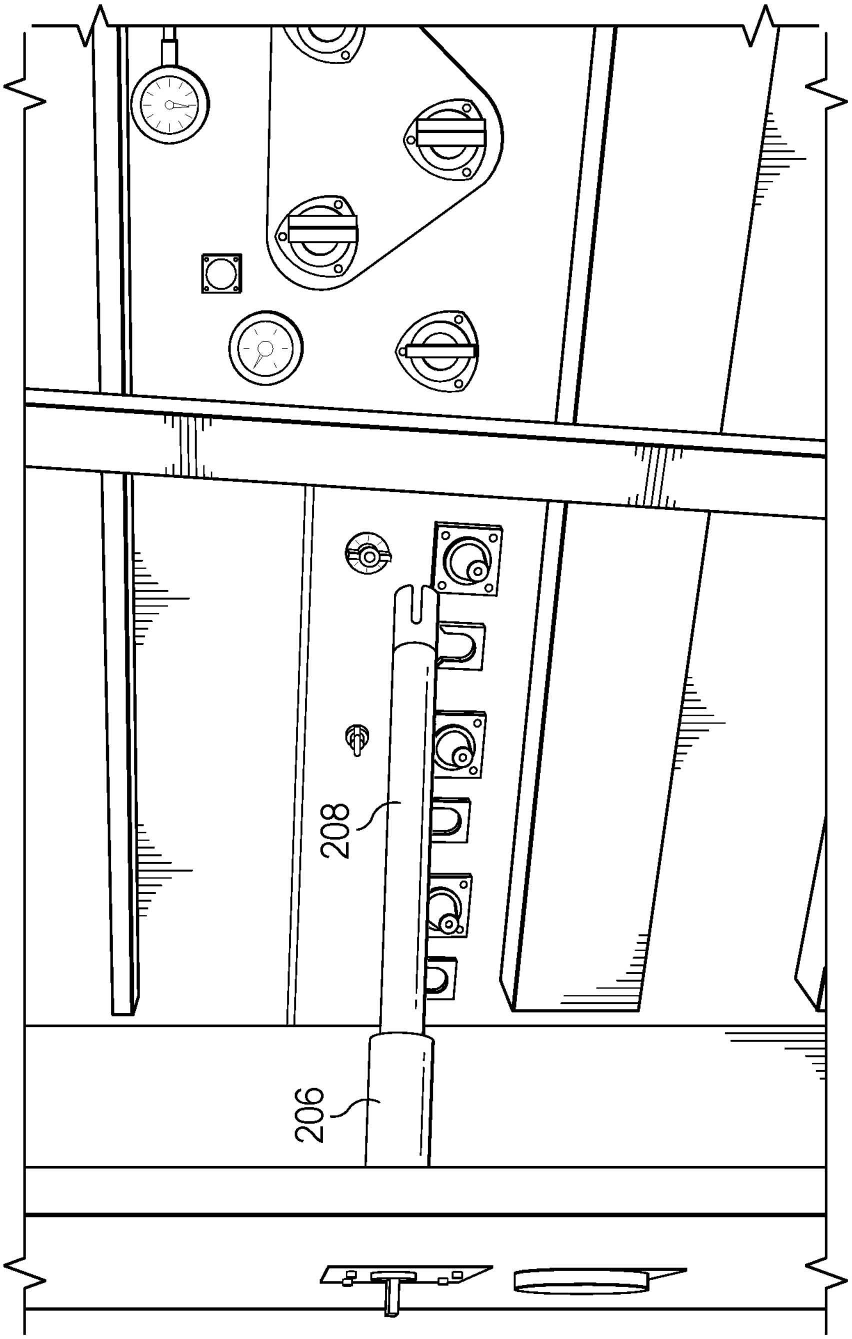
Figure 5D:
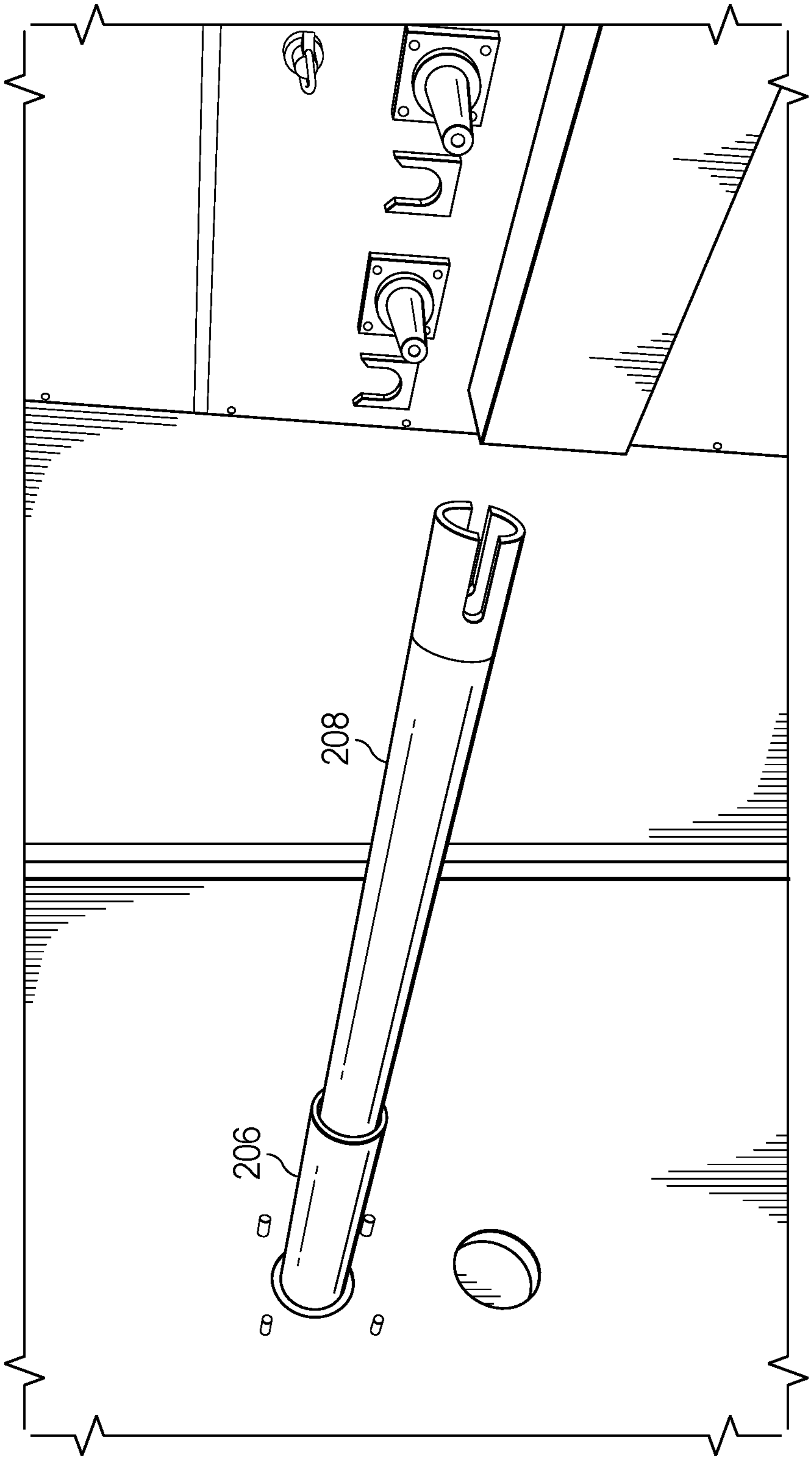
Figure 5E:
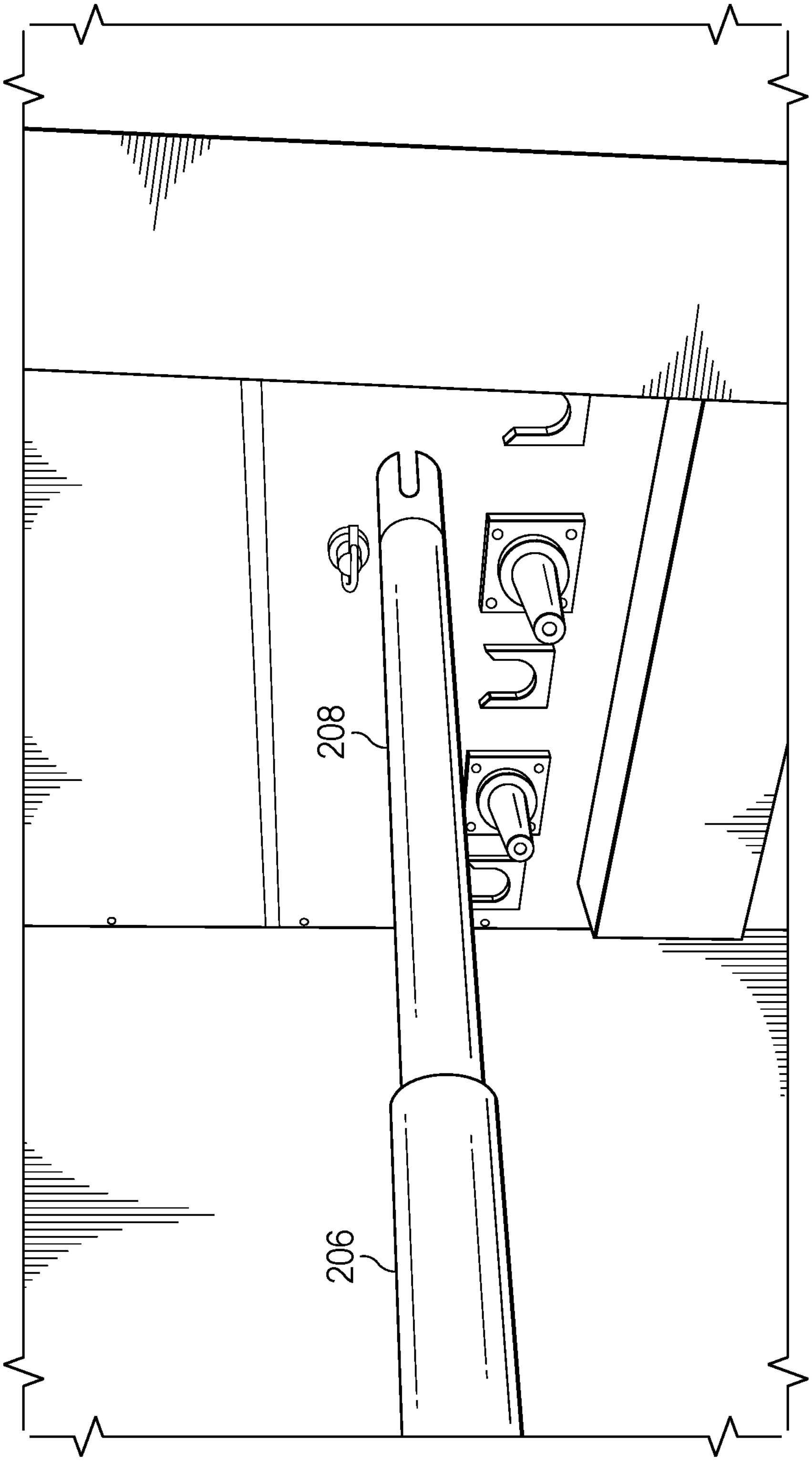

Referring now to FIG. 4, an image of an exploded view of a coupling shaft 208 in accordance with one embodiment of the present invention is shown. The coupling shaft 208 has an electrical insulator 402 (e.g., a two inch fiberglass pipe, etc.) disposed between an actuator side adapter 404 and a switch side adapter 406. The coupling shaft 208 has a length equal to or greater than a distance 226 (FIG. 2) between the switch actuator 222 and the hole 220 (FIG. 2) in the door 216 (FIG. 2) such that the switch side adapter 230 operably engages the switch actuator 222 and the actuator side adapter 228 is operably accessible from an exterior of the door 216 (FIG. 2) when the door 216 (FIG. 2) is closed. FIGS. 5A-5E are images illustrating the coupling shaft 208 positioned within the guide tube 206 in accordance with one embodiment of the present invention.

Figure 6A:
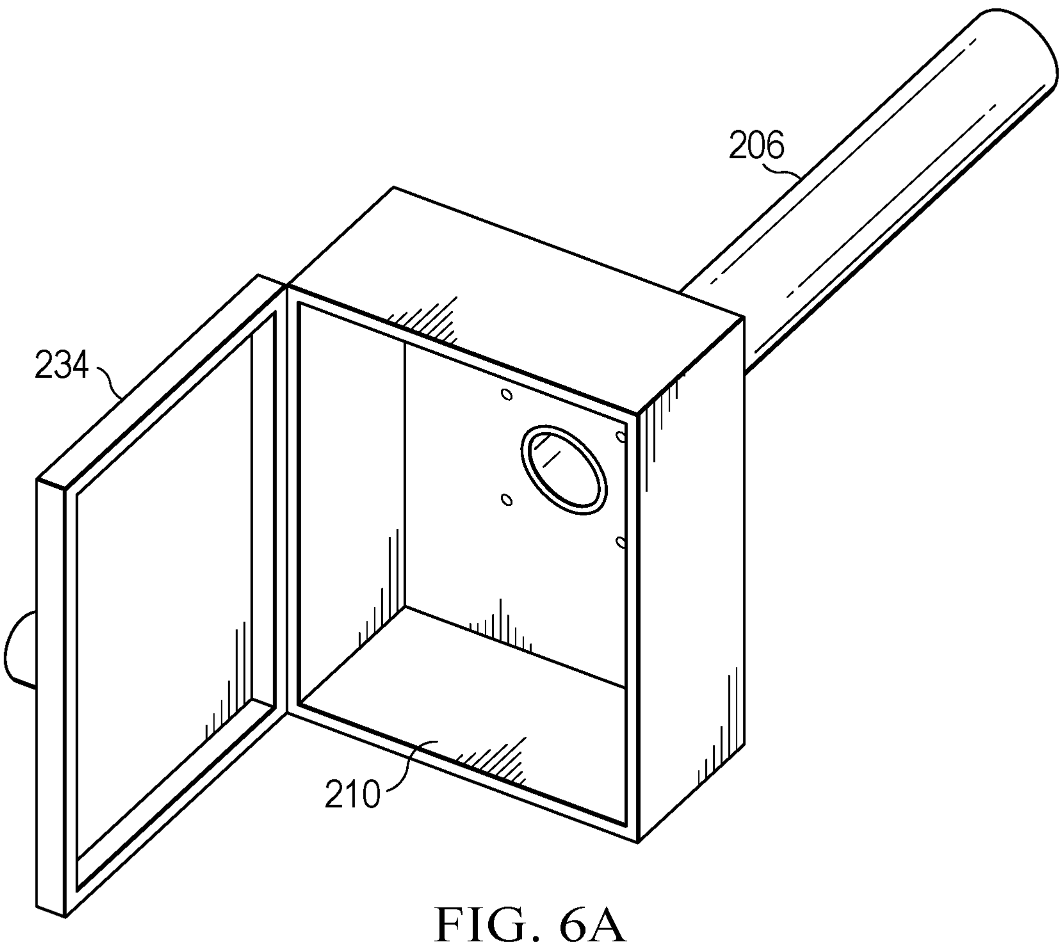
FIGS. 6A-6C are images of a cover or enclosure in accordance with various embodiments of the present invention.
Figure 6B:
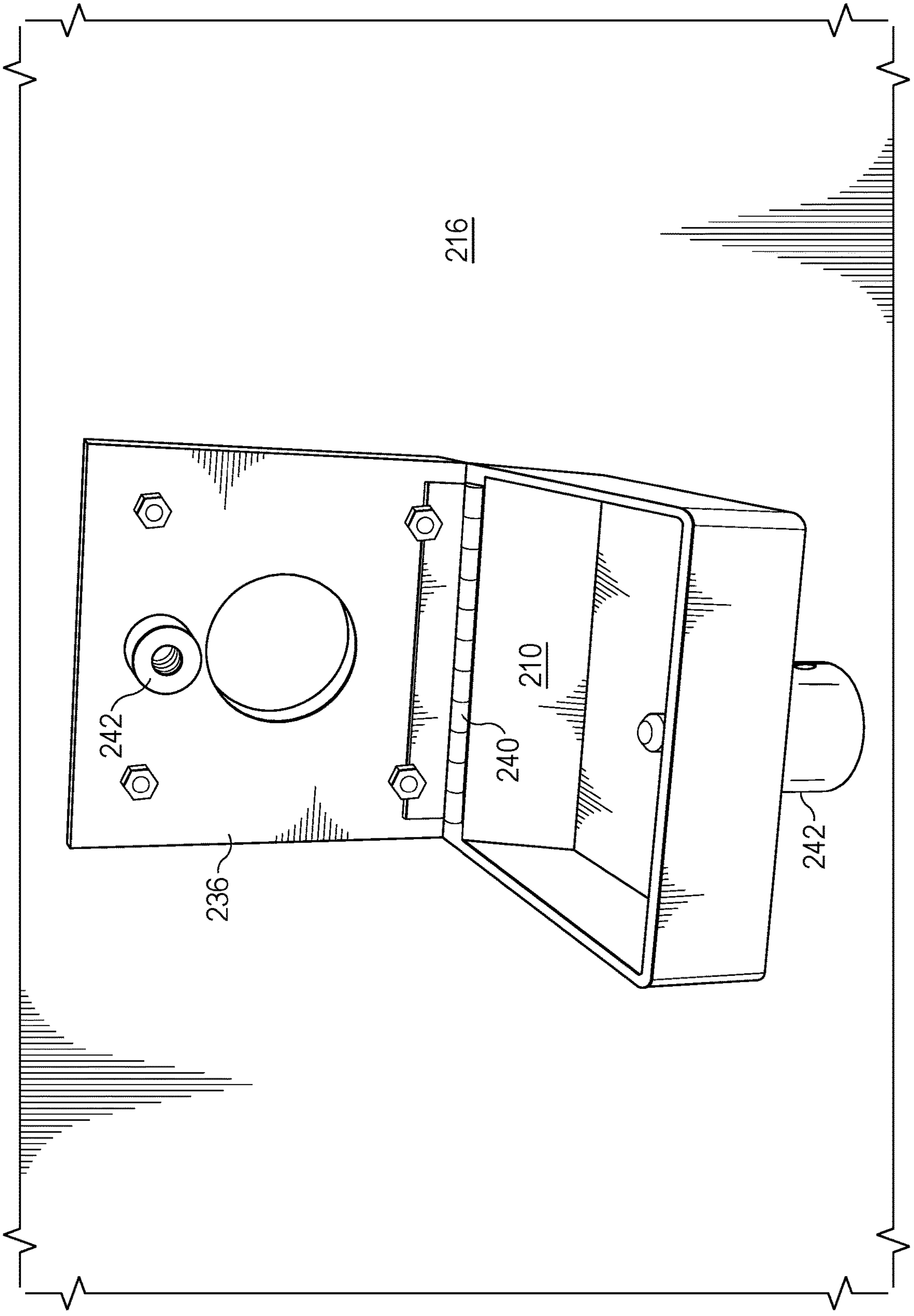
Figure 6C:
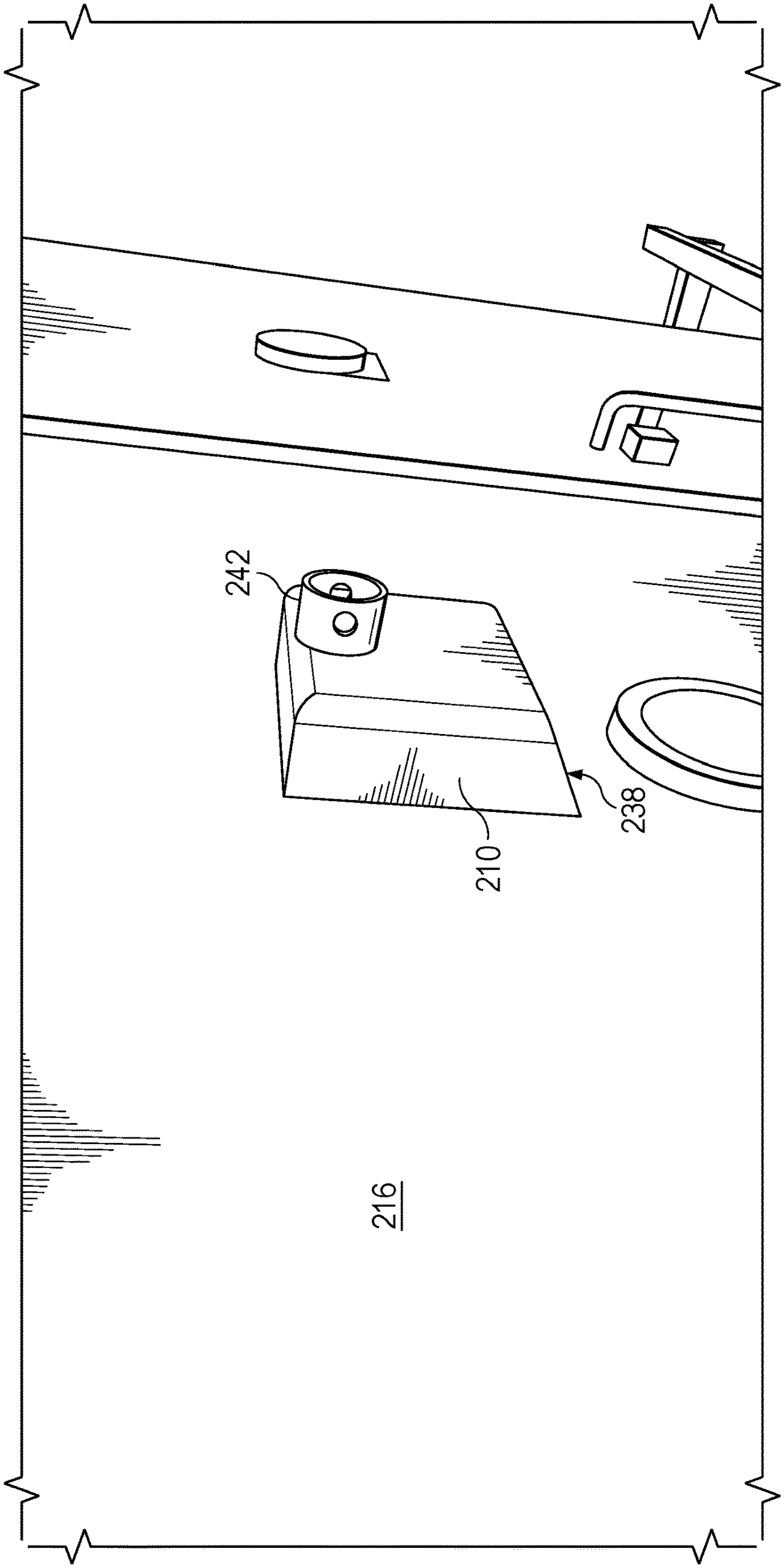
Figure 7A:
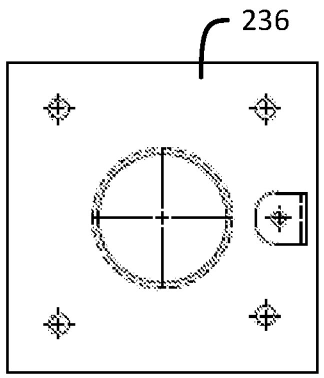
FIGS. 7A-7D depict various views of a guide tube in accordance with one embodiment of the present invention.
Figure 7B:
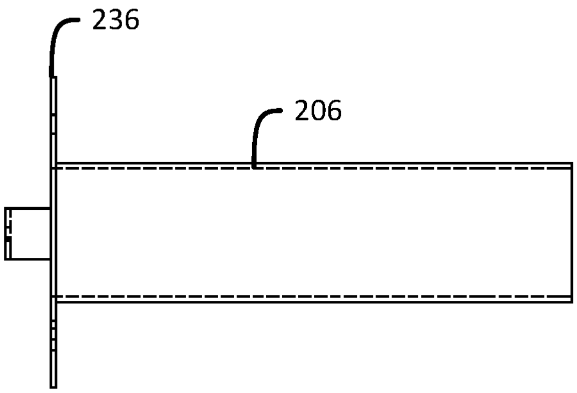
Figure 7C:
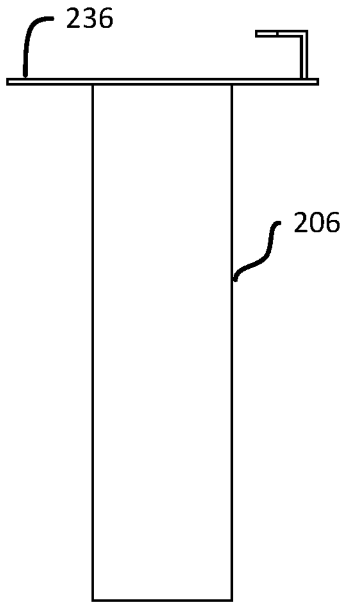
Figure 7D:
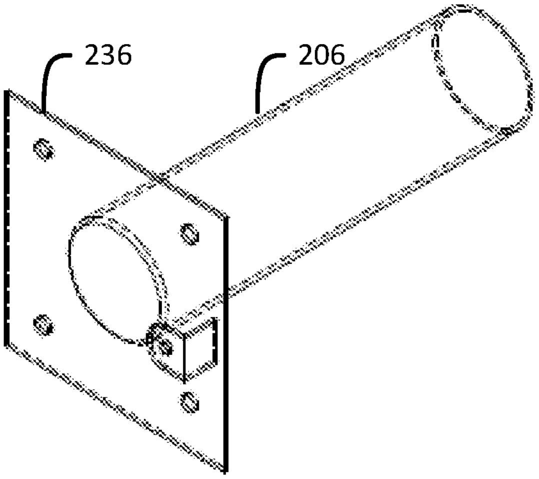
Figure 8A:
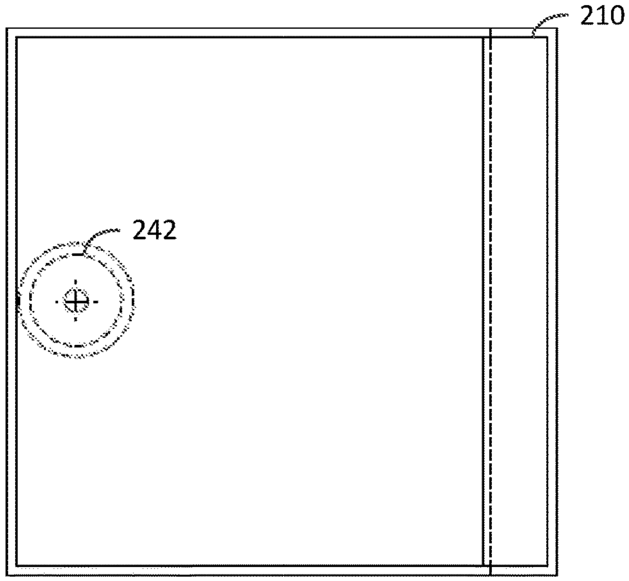
FIGS. 8A-8D depict various views of a cover or enclosure in accordance with one embodiment of the present invention.
Figure 8B:
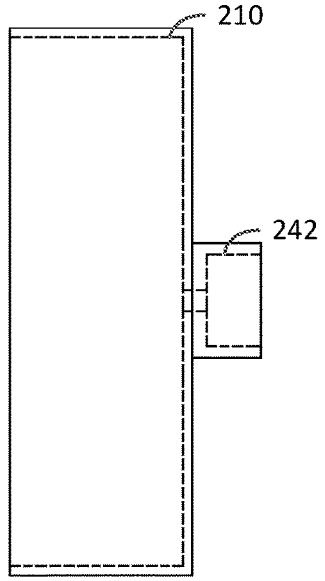
Figure 8C:
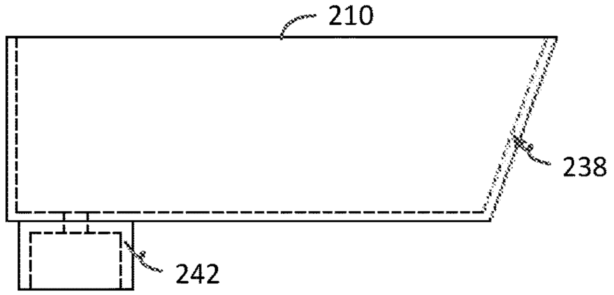
Figure 8D:
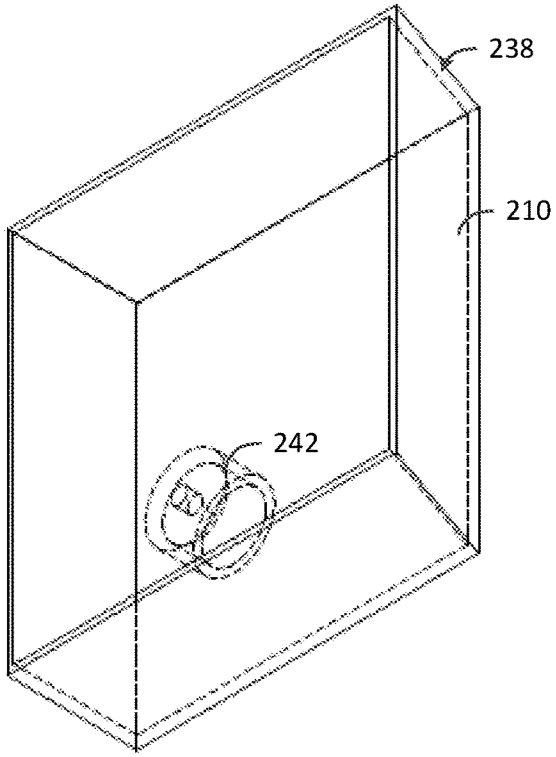

Now referring to FIGS. 6A-6C, images of a cover or enclosure 210 in accordance with various embodiments of the present invention are shown. As shown in FIG. 6A, the cover or enclosure 210 can be attached to the first end 212 of the guide tube 206 or the exterior of the door 216 proximate to the hole 220. The cover or enclosure 210 can be a box having a door (FIG. 6A). Alternatively, the cover or enclosure 210 includes a box having an angled or beveled side attached to a flange or plate, which is attached to the first end of the guide tube 206, with a hinge (FIGS. 6B-6C). The angled or beveled side positions the box at an angle of about 70-90 degrees with respect to the door when the box is in the open position (FIG. 6B). The cover or enclosure 210 has an open position (FIG. 6B) and a closed position (FIG. 6C). A lockable fastener is configured to secure the cover or enclosure in the closed position. For example, the lockable fastener can be a pentahead bolt with a hole for a padlock or other suitable device. In some embodiments, the cover or enclosure can be removeably attached to the first end of the guide tube, the flange or plate, or the exterior of the door. Note that the cover or enclosures shown are non-limiting examples, and the shape, size and configuration of the cover or enclosure can be changed to fit the requirements of a particular installation.

Figure 9A:
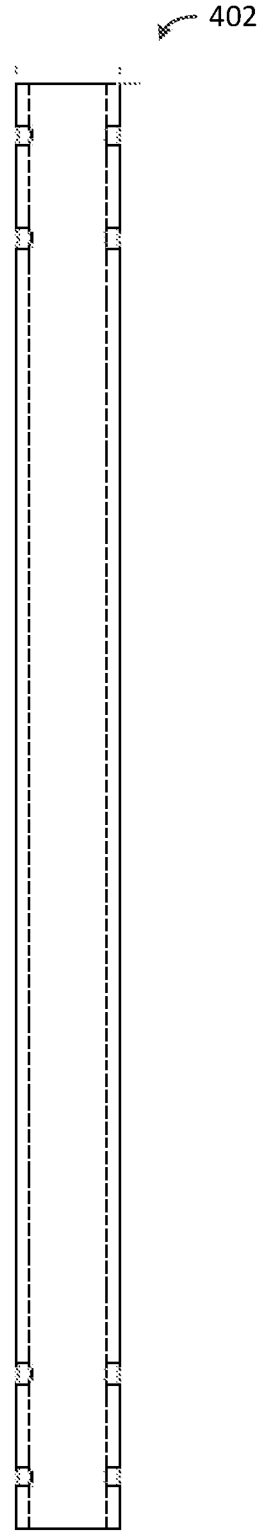
FIGS. 9A-9C depicts various views of an electrical insulator (FIG. 9A), an actuator side adapter (FIG. 9B), and a switch side adapter (FIG. 9C) of a coupling shaft in accordance with one embodiment of the present invention.
Figure 9B:
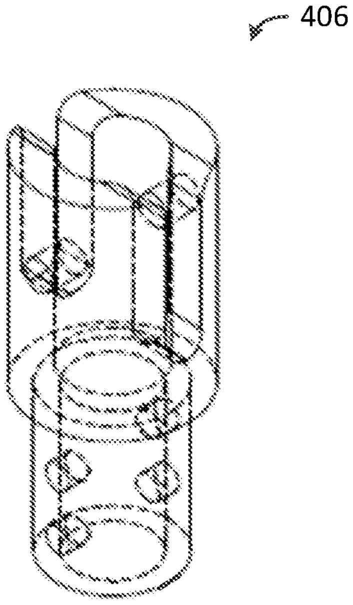
Figure 9C:
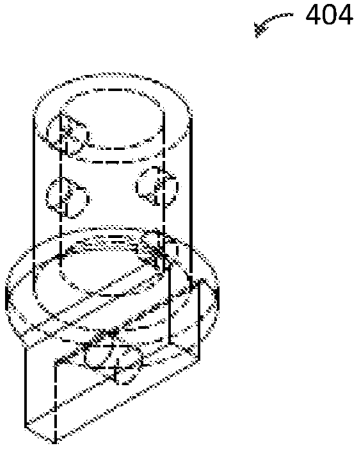

FIGS. 7A-7D depict various views of a guide tube 206 in accordance with one embodiment of the present invention. FIGS. 8A-8D depict various views of a cover or enclosure in accordance with one embodiment of the present invention are shown. FIGS. 9A-9C depicts various views of an electrical insulator 402 (FIG. 9A), an actuator side adapter 404 (FIG. 9B), and a switch side adapter 406 (FIG. 9C) of a coupling shaft 208 in accordance with one embodiment of the present invention.

Figure 10:
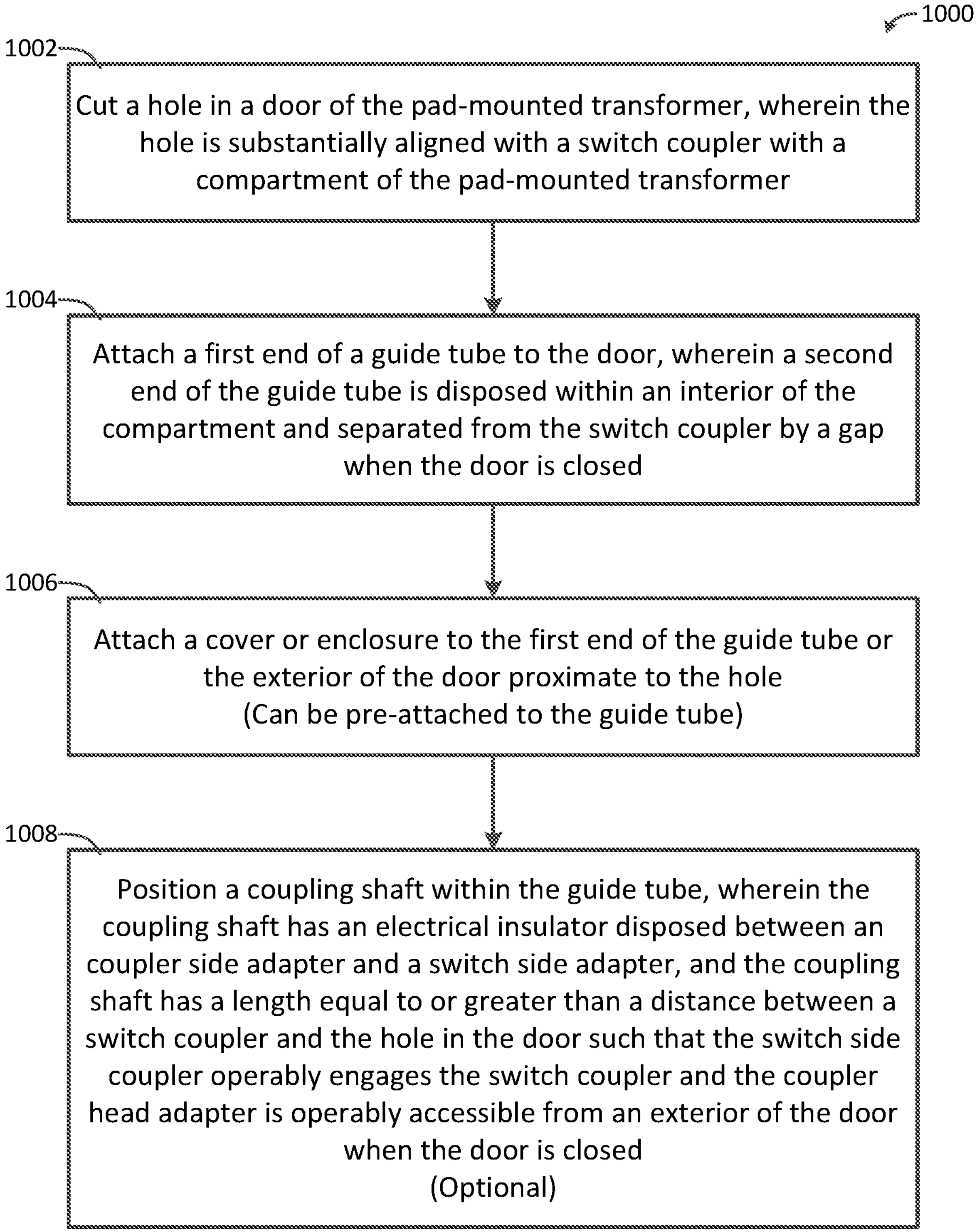
FIG. 10 is a flowchart depicting a method for installing an external switch actuator on a pad-mounted transformer in accordance with one embodiment the present invention.

Referring now to FIG. 10, a flowchart depicts a method 1000 for installing an external switch actuator on a pad-mounted transformer in accordance with one embodiment of the present invention. A hole is cut in a door of the pad-mounted transformer in block 1002, wherein the hole is substantially aligned with a switch actuator within a compartment of the pad-mounted transformer. A first end of a guide tube is attached to the door in block 1004, wherein a second end of the guide tube is disposed within an interior of the compartment and separated from the switch actuator by a gap when the door is closed. A cover or enclosure is attached to the first end of the guide tube or the exterior of the door proximate to the hole in block 1006, wherein the cover or enclosure has an open position and a closed position. Optionally, a coupling shaft is positioned within the guide tube in block 1008, wherein the coupling shaft has an electrical insulator disposed between an actuator side adapter and a switch side adapter, and the coupling shaft has a length equal to or greater than a distance between the switch actuator and the hole in the door such that the switch side adapter operably engages the switch actuator and the actuator side adapter is operably accessible from an exterior of the door when the door is closed. In some embodiments, the cover or enclosure is attached to the first end of the guide tube prior to installation on the pad-mounted transformer.

Figure 11A:
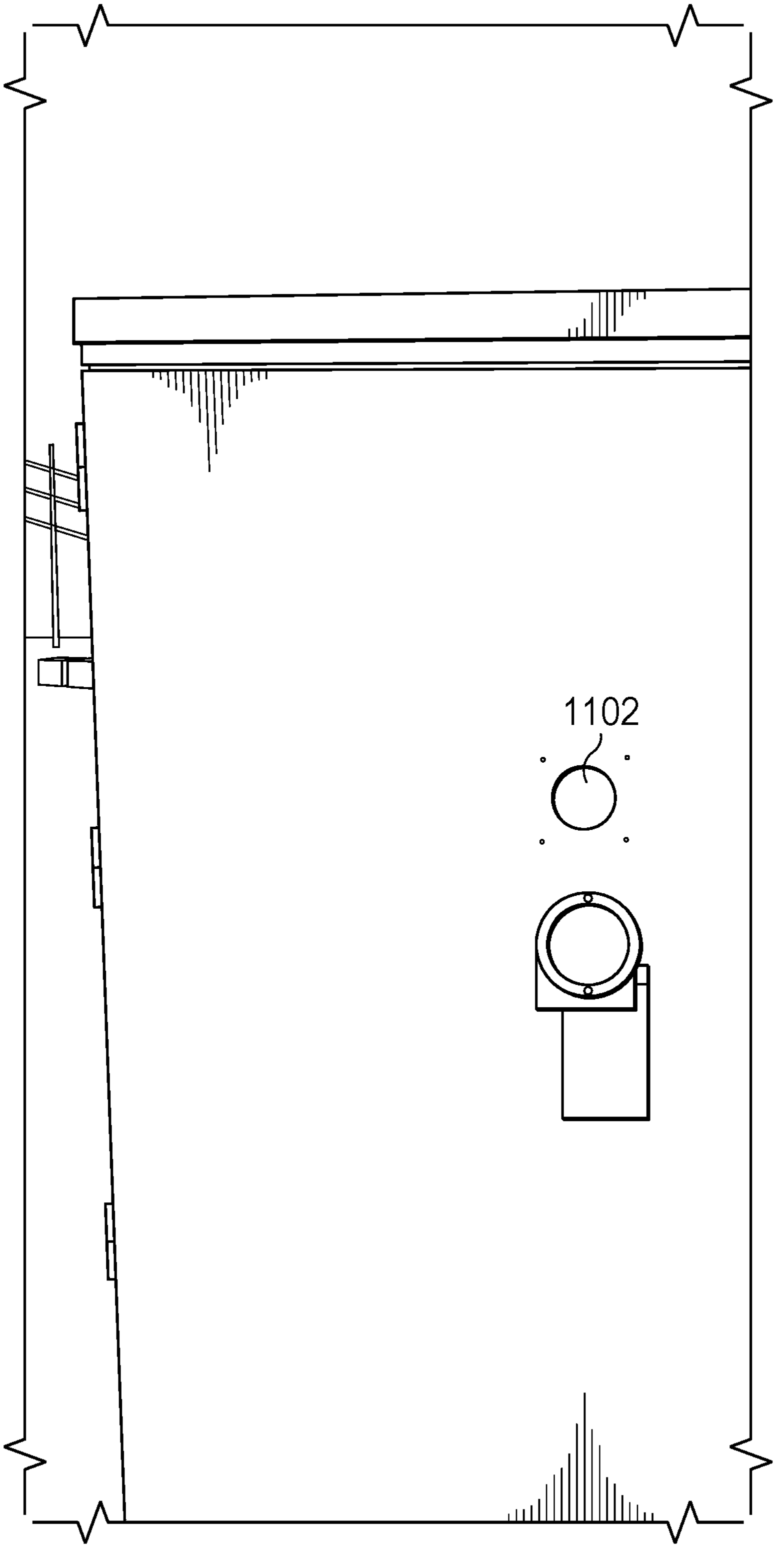
FIGS. 11A-11C illustrate an example of an installation method in accordance with one embodiment the present invention.
Figure 11B:
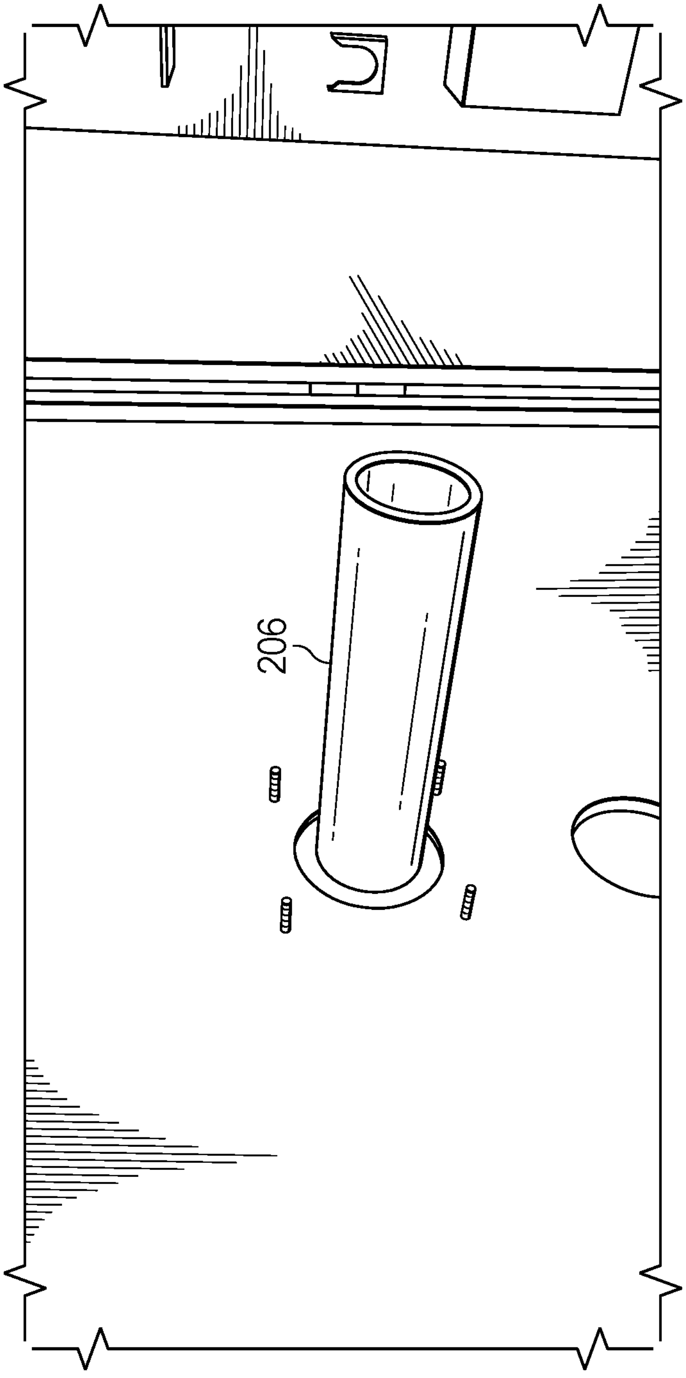
Figure 11C:
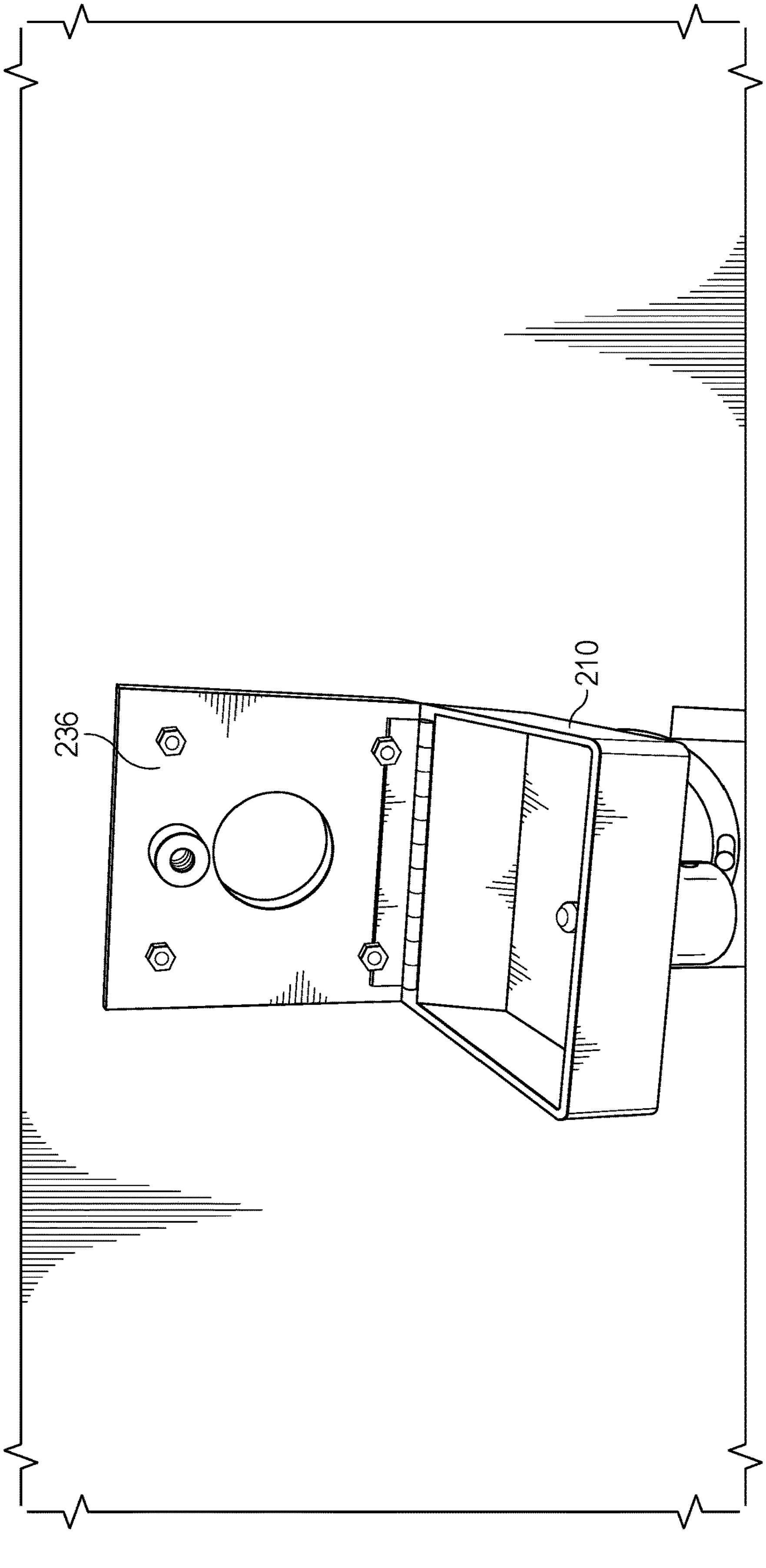

FIGS. 11A-11C illustrate an example of an installation method in accordance with one embodiment of the present invention.

In another aspect, the guide tube has a length that allows the door to be opened when the guide tube is attached to the door. In another aspect, the cover or enclosure includes a lockable fastener configured to secure the cover or enclosure in the closed position. In another aspect, the cover or enclosure is removeably attached to the first end of the guide tube or the exterior of the door. In another aspect, the first end of the guide tube includes a flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure includes a box having a door. In another aspect, the guide tube includes a moveable flap operably connected to the second end of the guide tube.

Figure 12:
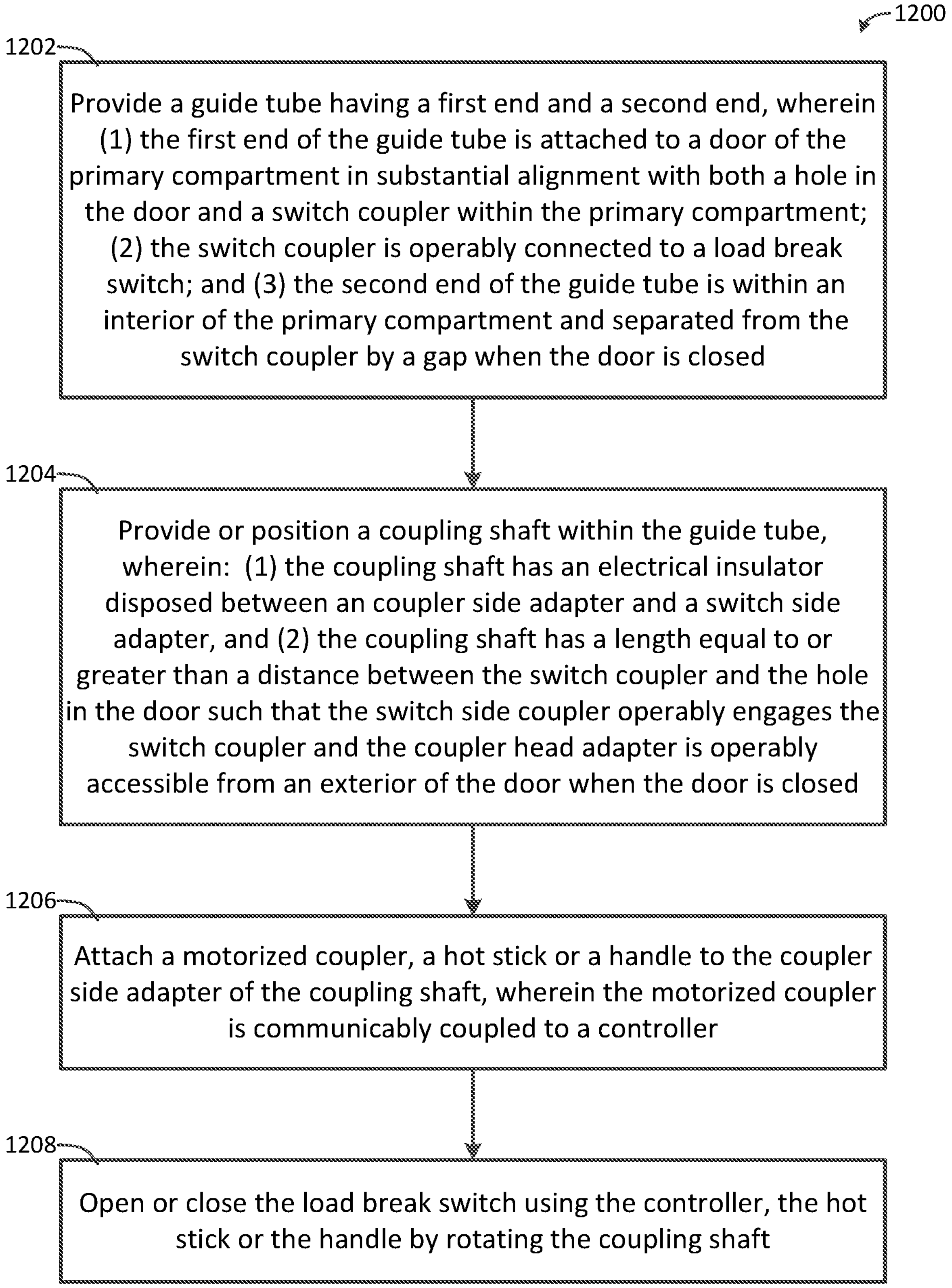
FIG. 12 is a flowchart illustrating a method for operating a load break switch within a primary compartment of a pad-mounted transformer in accordance with one embodiment the present invention
Figure 13A:
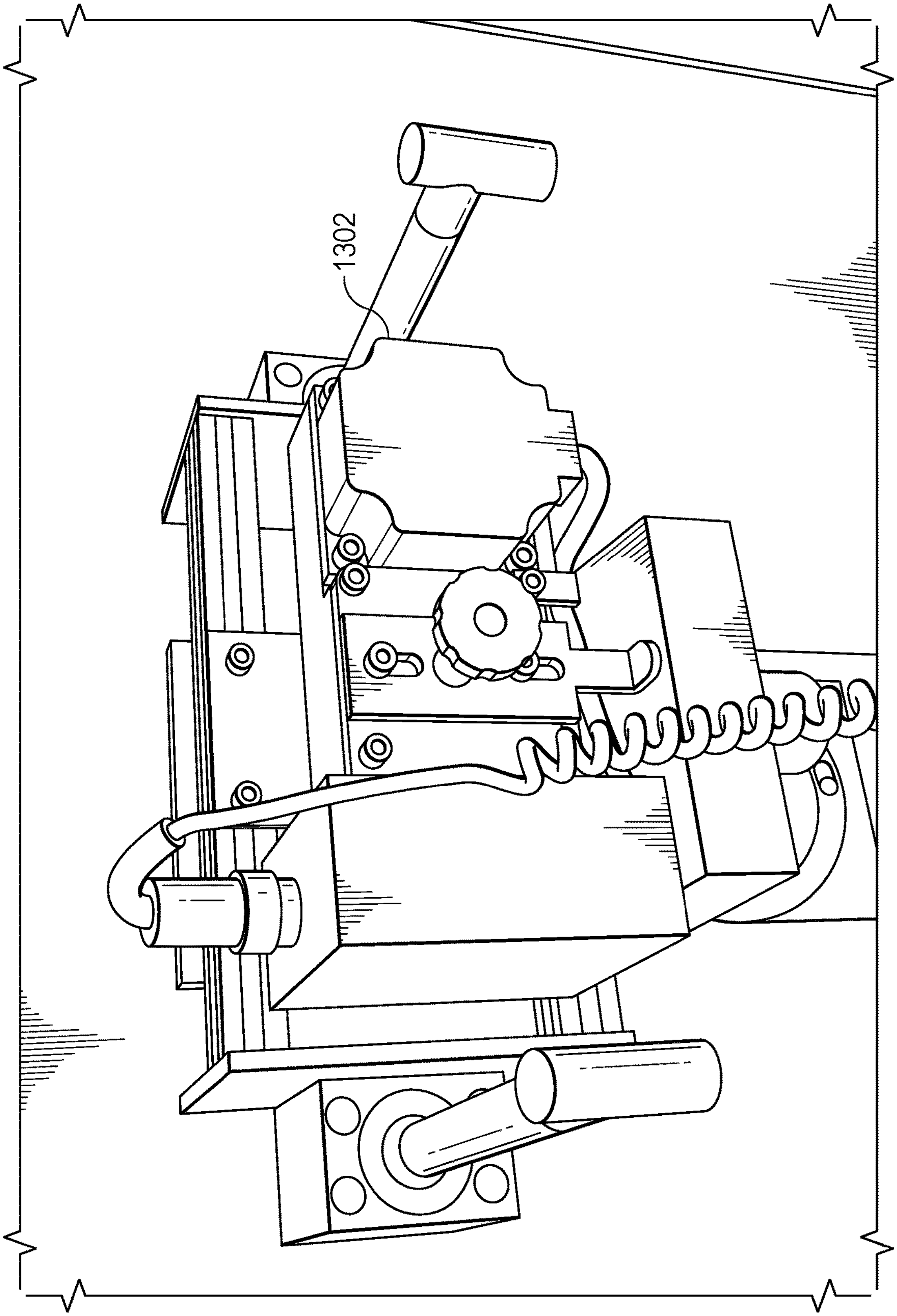
FIGS. 13A-13B are images of a motorized actuator and controller in accordance with one embodiment of the present invention.
Figure 13B:
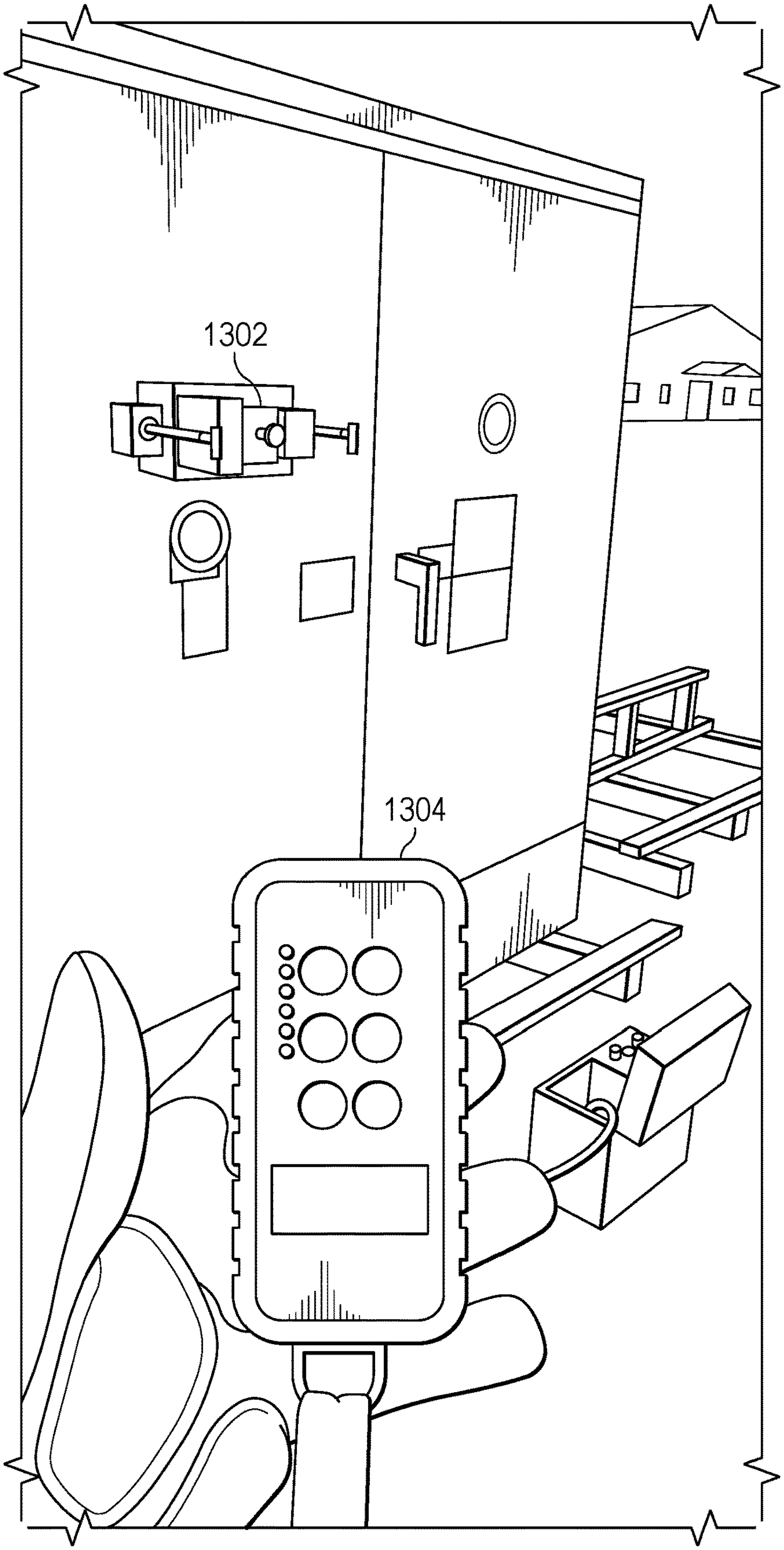

Now referring to FIG. 12, a flowchart illustrates a method 1200 for operating a load break switch within a primary compartment of a pad-mounted transformer in accordance with one embodiment of the present invention. A guide tube is provided in block 1202 having a first end and a second end, wherein: (1) the first end of the guide tube is attached to a door of the primary compartment in substantial alignment with both a hole in the door and a switch actuator within the primary compartment, (2) the switch actuator is operably connected to the load break switch, (3) the second end of the guide tube is within an interior of the primary compartment and separated from the switch actuator by a gap when the door is closed. A coupling shaft is provided or positioned within the guide tube in block 1204, wherein: (1) the coupling shaft comprises an electrical insulator disposed between an actuator side adapter and a switch side adapter, (2) the coupling shaft has a length equal to or greater than a distance between the switch actuator and the hole in the door such that the switch side adapter operably engages the switch actuator and the actuator side adapter is operably accessible from an exterior of the door when the door is closed. A motorized actuator, a hot stick or a handle is attached to the actuator side adapter in block 1206, wherein the motorized actuator is communicably coupled to a controller. The load break switch is opened or closed using the controller, the hot stick or the handle to rotate the coupling shaft in block 1408. FIGS. 13A-13B are images of a motorized actuator and controller in accordance with one embodiment of the present invention.

Another step may include opening a cover or enclosure attached to the first end of the guide tube or the exterior of the door proximate to the hole. In another aspect, the guide tube has a length that allows the door to be opened when the guide tube is attached to the door. In another aspect, the cover or enclosure further includes a lockable fastener configured to secure the cover or enclosure in the closed position. In another aspect, the cover or enclosure is removeably attached to the first end of the guide tube or the exterior of the door. In another aspect, the first end of the guide tube comprises flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure comprises a box having a door. In another aspect, the guide tube further comprises a moveable flap operably connected to the second end of the guide tube.

Based on the foregoing figures and description, a pad-mounted transformer one embodiment of the disclosure includes: a tank containing an electrical transformer and a switch electrically connected to the electrical transformer; a compartment attached to the tank, the tank including a primary compartment adjacent to a secondary compartment, wherein the primary compartment has a primary door and the secondary compartment has a secondary door; a set of primary voltage bushings within the primary compartment and electrically connected to the switch; a switch actuator within the primary compartment and operably connected to the switch; a set of secondary voltage bushings within the secondary compartment and electrically connected to the electrical transformer; a guide tube having a first end and a second end; the first end of the guide tube attached to the primary door in substantial alignment with both a hole in the primary door and the switch actuator; and the second end of the guide tube disposed within an interior of the primary compartment and separated from the switch actuator by a gap when the primary door is closed.

In another aspect, the pad-mounted transformer includes: a coupling shaft operably placed within the guide tube, the coupling shaft including an electrical insulator disposed between an actuator side adapter and a switch side adapter; and the coupling shaft having a length equal to or greater than a distance between the switch actuator and the hole in the primary door such that the switch side adapter operably engages the switch actuator and the actuator side adapter is operably accessible from an exterior of the primary door when the primary door is closed. In another aspect, a cover or enclosure is attached to the first end of the guide tube or configured to be attached to the exterior of the primary door proximate to the hole, wherein the cover or enclosure has an open position and a closed position. In another aspect, the guide tube has a length that allows the primary door to be opened when the guide tube is attached to the door. In another aspect, a lockable fastener is configured to secure the cover or enclosure in the closed position. In another aspect, the cover or enclosure is removeably attached to the first end of the guide tube or the exterior of the primary door. In another aspect, a motorized actuator is operably configured to engage the actuator side adapter; and a controller communicably coupled to the motorized actuator. In another aspect, the first end of the guide tube comprises flange or plate. In another aspect, the cover or enclosure is removably attached to the flange or plate. In another aspect, the cover or enclosure includes a box having an angled or beveled side attached to the flange or plate with a hinge; and the angled or beveled side positions the box at an angle of about 70-90 degrees with respect to the door when the box is in the open position. In another aspect, the cover or enclosure includes a box having a door. In another aspect, a moveable flap is operably connected to the second end of the guide tube.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word “a” or “an” when used in conjunction with the term “comprising” in the claims and/or the specification may mean “one,” but it is also consistent with the meaning of “one or more,” “at least one,” and “one or more than one.” The use of the term “or” in the claims is used to mean “and/or” unless explicitly indicated to refer to alternatives only or the alternatives are mutually exclusive, although the disclosure supports a definition that refers to only alternatives and “and/or.” Throughout this application, the term “about” is used to indicate that a value includes the inherent variation of error for the device, the method being employed to determine the value, or the variation that exists among the study subjects.

As used in this specification and claim(s), the words “comprising” (and any form of comprising, such as “comprise” and “comprises”), “having” (and any form of having, such as “have” and “has”), “including” (and any form of including, such as “includes” and “include”) or “containing” (and any form of containing, such as “contains” and “contain”) are inclusive or open-ended and do not exclude additional, unrecited elements or method steps. In embodiments of any of the compositions and methods provided herein, “comprising” may be replaced with “consisting essentially of” or “consisting of” As used herein, the phrase “consisting essentially of” requires the specified integer(s) or steps as well as those that do not materially affect the character or function of the claimed invention. As used herein, the term “consisting” is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term “or combinations thereof” as used herein refers to all permutations and combinations of the listed items preceding the term. For example, “A, B, C, or combinations thereof” is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, “about,” “substantial” or “substantially” refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as “about” may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words “means for” or “step for” are explicitly used in the particular claim.

What is claimed is:

1. An external switch actuator for a transformer comprising:

a guide tube having a first end and a second end, wherein the first end of the guide tube is configured to be attached to a door of a compartment of the transformer in substantial alignment with both a hole in the door and a switch actuator within the compartment, the first end of the guide tube is further configured to remain attached to the door when the door is open and closed, the second end of the guide tube is configured to be disposed within the compartment, and the guide tube has a length that does not interfere with opening the door.

2. The external switch actuator of claim 1, wherein the second end of the guide tube is separated from the switch actuator by a gap when the door is closed.

3. The external switch actuator of claim 1, further comprising a moveable flap operably connected to the second end of the guide tube.

4. The external switch actuator of claim 1, further comprising a coupling shaft operably configured to be placed within the guide tube, wherein the coupling shaft has a length equal to or greater than a distance between the switch actuator and the hole in the door.

5. The external switch actuator of claim 4, wherein the coupling shaft is insulated.

6. The external switch actuator of claim 4, further comprising:

a motorized actuator operably configured to engage an actuator side adapter of the coupling shaft; and a controller communicably coupled to the motorized actuator.

7. The external switch actuator of claim 1, further comprising a cover or enclosure attached to the first end of the guide tube or configured to be attached to an exterior of the door proximate to the hole, wherein the cover or enclosure has an open position and a closed position.

8. The external switch actuator of claim 7, further comprising a lockable fastener configured to secure the cover or enclosure in the closed position.

9. The external switch actuator of claim 7, wherein the cover or enclosure is removeably attached to the first end of the guide tube or the exterior of the door.

10. The external switch actuator of claim 7, wherein the cover or enclosure comprises a box having a door.

11. The external switch actuator of claim 7, wherein:

the first end of the guide tube comprises a flange or plate; and the cover or enclosure is removably attached to the flange or plate.

12. The external switch actuator of claim 11, wherein:

the cover or enclosure comprises a box having an angled or beveled side attached to the flange or plate with a hinge; and the angled or beveled side positions the box at an angle of about 70-90 degrees with respect to the door when the box is in the open position.

13. A method for installing an external switch actuator on a transformer comprising:

cutting a hole in a door of the transformer, wherein the hole is substantially aligned with a switch actuator within a compartment of the transformer; and attaching a first end of a guide tube to the door in substantial alignment with the hole in the door, wherein a second end of the guide tube is disposed within an interior of the compartment, the first end of the guide tube remains attached to the door when the door is open and closed, and the guide tube has a length that does not interfere with opening the door.

14. The method of claim 13, further comprising positioning a coupling shaft within the guide tube, wherein the coupling shaft has a length equal to or greater than a distance between the switch actuator and the hole in the door.

15. The method of claim 14, further comprising attaching a cover or enclosure to the first end of the guide tube or an exterior of the door proximate to the hole, wherein the cover or enclosure has an open position and a closed position.

16. The method of claim 15, securing the cover or enclosure in a closed position using a lockable fastener.

17. A method for operating a switch within a compartment of a transformer comprising;

providing a guide tube having a first end and a second end, wherein: (1) the first end of the guide tube is attached to a door of the compartment in substantial alignment with both a hole in the door and a switch actuator within the compartment, (2) the guide tube has a length that does not interfere with opening the door while the guide tube is attached to the door, (3) the switch actuator is operably connected to the switch, and (4) the second end of the guide tube is within an interior of the compartment;

providing or positioning a coupling shaft within the guide tube, wherein: (1) the coupling shaft has an actuator side adapter and a switch side adapter, and (2) the coupling shaft has a length equal to or greater than a distance between the switch actuator and the hole in the door;

attaching a motorized actuator, a hot stick or a handle to the actuator side adapter while the door is closed, wherein the motorized actuator is communicably coupled to a controller; and opening or closing the switch using the controller, the hot stick or the handle to rotate the coupling shaft.

18. A transformer comprising:

a tank containing an electrical transformer and a switch electrically connected to the electrical transformer;

one or more compartments attached to the tank, wherein each of the one or more compartments has a door;

a switch actuator within one of the one or more compartments and operably connected to the switch;

a guide tube having a first end and a second end, wherein the guide tube has a length that does not interfere with opening the door;

the first end of the guide tube is attached to the door in substantial alignment with both a hole in the door and the switch actuator;

the first end of the guide tube remains attached to the door when the door is open and closed; and the second end of the guide tube disposed within an interior of the one of the one or more compartments when the door is closed.

19. The transformer of claim 18, wherein the second end of the guide tube is separated from the switch actuator by a gap when the door is closed.

20. The transformer of claim 18, further comprising a moveable flap operably connected to the second end of the guide tube.

21. The transformer of claim 18, further comprising a coupling shaft operably configured to be placed within the guide tube, wherein the coupling shaft has a length equal to or greater than a distance between the switch actuator and the hole in the door.

22. The transformer of claim 21, wherein the coupling shaft is insulated.

23. The transformer of claim 21, further comprising:

a motorized actuator operably configured to engage an actuator side adapter of the coupling shaft; and a controller communicably coupled to the motorized actuator.

24. The transformer of claim 18, further comprising a cover or enclosure attached to the first end of the guide tube or configured to be attached to an exterior of the door proximate to the hole, wherein the cover or enclosure has an open position and a closed position.

25. The transformer of claim 24, further comprising a lockable fastener configured to secure the cover or enclosure in the closed position.

26. The transformer of claim 24, wherein the cover or enclosure is removeably attached to the first end of the guide tube or the exterior of the door.

27. The transformer of claim 24, wherein the cover or enclosure comprises a box having a door.

28. The transformer of claim 24, wherein:

the first end of the guide tube comprises a flange or plate; and the cover or enclosure is removably attached to the flange or plate.

29. The transformer of claim 28, wherein:

the cover or enclosure comprises a box having an angled or beveled side attached to the flange or plate with a hinge; and the angled or beveled side positions the box at an angle of about 70-90 degrees with respect to the door when the box is in the open position.

* * * * *